US005818532A

United States Patent [19]
Malladi et al.

[11] Patent Number: 5,818,532
[45] Date of Patent: Oct. 6, 1998

[54] MICRO ARCHITECTURE OF VIDEO CORE FOR MPEG-2 DECODER

[75] Inventors: Srinivasa R. Malladi, San Jose; Venkat Mattela, Sunnyvale, both of Calif.

[73] Assignee: LSI Logic Corporation, Milpitas, Calif.

[21] Appl. No.: 642,396

[22] Filed: May 3, 1996

[51] Int. Cl.[6] .............................. H04N 7/12; H04N 11/02; H04N 11/04
[52] U.S. Cl. ............................................ 348/405; 348/414
[58] Field of Search ..................................... 348/390, 405, 348/412, 416, 473, 414, 417; H04N 7/12, 11/02, 11/04

[56] References Cited

U.S. PATENT DOCUMENTS

| | | | |
|---|---|---|---|
| 5,126,726 | 6/1992 | Howard et al. | 340/728 |
| 5,394,473 | 2/1995 | Davidson | 381/36 |
| 5,448,310 | 9/1995 | Kopet et al. | 348/699 |
| 5,473,631 | 12/1995 | Moses | 375/202 |
| 5,506,832 | 4/1996 | Arshi et al. | 370/13 |
| 5,515,107 | 5/1996 | Chiang et al. | 348/473 |
| 5,576,765 | 11/1996 | Cheney et al. | 348/407 |
| 5,576,958 | 11/1996 | Kawakatsu et al. | 364/725 |
| 5,594,789 | 1/1997 | Seazholtz et al. | 379/207 |
| 5,598,352 | 1/1997 | Rosenau et al. | 364/514 A |
| 5,623,311 | 4/1997 | Phillips et al. | 348/396 |
| 5,635,985 | 6/1997 | Boyce et al. | 348/402 |
| 5,638,128 | 6/1997 | Hoogenboom et al. | 348/416 |

OTHER PUBLICATIONS

Martin Boliek, "*Real–Time Discrete Cosine Transform Chip Using Generalized Chen Transform Technology,*" pp. 428–431, Ricoh California Research Center, Menlo Park, CA.

Unknown, "*Digital Audio Compression (AC–3),*" T3 review copy of draft ATSC audio standard, Aug. 12, 1994, Doc. T3/251.

Unknown, "*Information Technology–Generic Coding of Moving Pictures and Associated Audio Information: Video,*" ISO/IEC 13818–2, Draft International Standard, Nov. 9, 1994.

Unknown, "*Coding of Moving Pictures and Associated Audio,*" ISO/IEC 13818–3, International Standard, Nov. 11, 1994.

Dave Bursky, "*Single Chip Performs Both Audio and Video Decoding,*" Electronic Design, Apr. 3, 1995.

Unknown, "Coding of Moving Pictures and Associated Audio for Digital Storage Media At Up To About 1.5 MBIT/s," 3–11171 rev. 1, (Part 3 Audio), May 30, 1995.

Jones, et al., "*Futurebus Interface from Off–the–Shelf Parts*", IEEE, pp. 38–41, Continue on pp. 84–93, Feb. 1991.

J. DeTar, "*LSI Logic adds to telecom–specific core library*", Electronic News, p. 25, Sep. 19, 1994.

(List continued on next page.)

*Primary Examiner*—Tommy P. Chin
*Assistant Examiner*—Nhon T. Diep
*Attorney, Agent, or Firm*—Hickman & Martine, LLP

[57] ABSTRACT

Disclosed is a reusable hardware layout ("core") for performing some, but not all, MPEG-2 video decoding functions. The information content of the core may be stored on a machine readable media and includes a series of hardware layouts specifying the locations and features of various circuit elements comprising the video core architecture. The disclosed video decoder core design specifies that at least the following MPEG-2 functions are performed by the hardware: inverse scan, inverse quantization, inverse discrete cosine transform, half pel compensation, and merge. Other MPEG-2 functions such as motion vector decoding, variable length decoding, and run level decoding are not performed by hardware video cores fabricated in accordance with video core design. To implement the specified video core MPEG-2 functions, the video core employs, as architecturally distinct logic blocks, an inverse quantization unit, an inverse discrete cosine transform unit, a half pel compensation unit, a merge and store unit, and registers storing control information used by the other units.

24 Claims, 13 Drawing Sheets

OTHER PUBLICATIONS

F. Gardner, "*LSI eases PCI bus development*", Electronic News, p. 197, Aug. 1, 1994.

L. Gwennap, "*LSI delivers MPEG decoder for digital TV*", p. 20, Microprocessor Report, May 10, 1993.

C. Joly, et al., "*ASIC integration relies on reusable cores*", Electronic Engineering Times, p. 46, May 1, 1995.

Unknown, "*Coding of Moving Pictures and Associated Audio–for Digital Storage Media at up to about 1.5 Mbit/s*", Aug. 2, 1996, ISO, CD 11172–1 rev. 1.

MICRO ARCHITECTURE OF VIDEO CORE FOR MPEG-2 DECODER

CROSS REFERENCE TO RELATED APPLICATIONS

This application is related to the following U.S. patent applications: (1) U.S. patent application Ser. No. 08/643,185 filed on the same day as the instant application, and naming Srinivasa R. Malladi, Marc A. Miller, and Kwok K. Chau as inventors, and entitled "Method for Partitioning Hardware and Firmware Tasks in Digital Audio/Video Decoding," (2) U.S. patent application Ser. No. 08/642,520 filed on the same day as the instant application, and naming Srinivasa R. Malladi and Mahadev S. Kolluru as inventors, and entitled "Microarchitecture for Audio Core for an MPEG-2 and AC-3 Decoder," and (3) U.S. patent application Ser. No. 08/642,393 filed on the same day as the instant application, and naming Srinivasa R. Malladi as inventor, and entitled "Method and Apparatus for Designing Re-useable Core Interface Shells." All three applications are incorporated herein by reference in their entireties and for all purposes.

BACKGROUND OF THE INVENTION

The present invention relates to systems for decoding coded video information. More specifically, the invention relates to microarchitectures of hardware cores for performing MPEG-2 decoding.

As digital processing systems have become faster and endowed with greater throughput and storage capacity, it has become apparent that integrated circuits, at least those specifically designed for the task, could reconstruct compressed digital video information to provide good quality video display. In the late 1980s, a digital video reconstruction standard known as "MPEG" (for Motion Pictures Experts Group) was promulgated by the International Standards Organization (ISO). MPEG video syntax provides an efficient way to represent image sequences in the form of compact coded data.

MPEG also defines the form of an unambiguously compressed bit stream generated for digital video data. Given knowledge of the MPEG rules, one can design a decoder which reconstructs a video sequence from the compressed bit stream. The first version of MPEG (MPEG-1) was optimized to handle data at a rate of 1.5 Mbits/second and reconstruct video frames at 30 Hz, with each frame having a resolution of 352 pixels by 240 lines in the case the NTSC video standard and 352 pixels by 288 lines in the case of the PAL video standard. Decoded MPEG-1 video can approximate the perceptual quality of consumer video tape (VHS).

MPEG-2 was initiated in the early 1990s to define a syntax for efficient representation of broadcast video. With the MPEG-2 standard, frames of 720 pixels/line by 480 lines (NTSC) or 720 pixels/line by 576 lines (PAL) are displayed at 30 Hz. The MPEG-2 decoding algorithms require certain steps such as inverse scan, inverse quantization, inverse discrete cosine transform, half pel (or half pixel) compensation, merge prediction and error, motion vector decoding, variable length decoding, and run level decoding. All of these functions are described in the ISO's MPEG-2 standard Document ISO/IEC 13818-2: 1995(E) (hereinafter "the ISO/MPEG-2 Document"). That document is incorporated herein by reference for all purposes.

Hereinafter, except where distinctions between the two versions of the MPEG standard exist, the terms "MPEG," "MPEG-1," and "MPEG-2" will be used interchangeably to reference those video decoding algorithms promulgated in the original MPEG-1 Document as well as in the MPEG-2 Document, and any future versions of MPEG decoding.

While CPU digital processing power has improved markedly in recent years, the shear volume of encoded/compressed data that must be decompressed and displayed at 30 Hz generally requires that some system hardware, beyond the CPU, be dedicated to MPEG-2 decoding. CPUs like SPARC from Sun Microsystems, Inc. of Mountain View, Calif., MIPS from Silicon Graphics, Inc. of Mountain View, Calif., Pentium from Intel Corporation of Santa Clara, Calif., etc. can not, in themselves, handle MPEG-2 decoding. Thus, software/firmware implementation of the MPEG-2 decoding algorithm is not yet practical for mass market consumer applications, and dedicated hardware must be employed to perform at least some MPEG-2 decoding functions.

While the ISO/MPEG-2 standard does specify the form that encoded video data must take, it does not specify either the exact sequence of steps or the hardware for decoding the data. Thus, designers of MPEG-2 decoding systems are free to provide their own designs for particular applications. In fact it is expected that each time an MPEG-2 decoder is to be designed for a new application, a designer will generate a new integrated circuit layout for the decoder.

Various MPEG-2 decoder chips are now available including the HDM8211M (from Hyundai Corporation of Seoul Korea) full MPEG-2 decoder of audio, video, and system (transport) bitstreams. See Bursky, "Single Chip Performs Both Audio and Video Decoding" Electronic Design, Apr. 3, 1995, pp. 77–80. This integrated circuit includes an MPEG-2 video decoder, an audio decoder, a system stream demultiplexer (this block separates the video and audio streams), a video display, a DRAM controller, and a 32-bit RISC processor (licensed from the SPARC Technology Business Group) which controls the internal workings of the MPEG-2 chip.

Designing new MPEG-2 decoder hardware such as the above described HDM8211M is, of course, a quite expensive process. The design is first provided as a Boolean description in a hardware design language such as Verilog. Then the code for the processor design model is used to create a net list, which is, in turn, used to create a physical layout for the integrated circuit. The physical layout must then converted to reticles (or masks) for fabricating the ultimate silicon version of the integrated circuit. At each stage in the process, from hardware design language description through silicon hardware, the integrated circuit must be extensively tested for bugs and to improve performance.

While this intensive procedure may be warranted in the case of a microprocessor or other chip which is likely to be sold in high volumes, it may not be justified in the case of integrated circuits having more limited applications, such as "system on a chip" integrated circuits which include multiple complete hardware functionalities such as CPUs, ATMs, and possibly MPEG-2 decoders. Thus, it would be desirable to find a way to improve the ease with which new MPEG-2 decoder integrated circuits are designed and brought to market.

SUMMARY OF THE INVENTION

The present invention provides a reusable hardware layout ("core") for performing some, but not all, MPEG-2 video decoding functions. The functional blocks comprising this "video core" define a unique hardware architecture which can be used with additional hardware or software for performing those MPEG-2 video decoding functions not performed by the video core.

A chip designer may use the video core of this invention to expedite the designing of an MPEG-2 video decoder. However, because the video core of this invention performs only some of the MPEG-2 video decoding steps, the designer is free to design blocks, optimized for the designer's purposes, to perform the remaining MPEG-2 functions. The video core of this invention is particularly useful for expeditiously designing "system" chips containing multiple cores on a single chip. Such cores might include, for example, the MPEG-2 video core of this invention, a DRAM core, an audio core, and a CPU core.

A significant benefit of a video core derives from its availability for repeated use in many different chips for different applications. In each such chip, the MPEG-2 video decoding functions specified by the video core can be employed without redesign. Thus, the video core may be used on a first integrated circuit having a first integrated circuit design and on a second integrated circuit having a second integrated circuit design, with the first and second integrated circuit designs having at least some features not in common. If a system chip is employed, the first integrated circuit design may include a first collection of cores, while the second integrated circuit may include a second collection of cores, etc.—even though the first and second collections of cores have at least one core not in common.

The video core design itself is preferably stored on a machine readable media such as a magnetic or optical storage unit. The information content of the core preferably includes a series of hardware layouts specifying the locations and features of various circuit elements comprising the video core architecture. Ultimately, the video core design is implemented as hardware on one or more chips. Thus, the video core design exists as both an intangible description of hardware and as the actual hardware itself.

In a preferred embodiment, the video decoder core design specifies that at least the following MPEG-2 functions are performed by the hardware: inverse scan, inverse quantization, inverse discrete cosine transform, half pel compensation, and merge. All these functions are detailed in the ISO/MPEG-2 standard Document. In especially preferred embodiments, other MPEG-2 functions such as motion vector decoding, variable length decoding, and run level decoding are not performed by the hardware video core of this invention. To implement the specified video core MPEG-2 functions, the video core employs, as architecturally distinct logical blocks, an inverse quantization unit, an inverse discrete cosine transform unit, a motion compensation unit, a merge and store unit, and registers storing control information used by all of units. Together with these blocks, the video core includes the following interface paths: (i) a slave CPU interface path for quantization matrix download, (ii) an I/O path for register access, (iii) an input path for coefficient data, (iv) input path for motion compensation, and (v) an output path for decoded samples.

The inverse quantization unit performs at least the inverse quantization function and includes the following interfaces: (a) an input path for receiving encoded discrete cosine transform coefficients from a sequence of encoded video data (e.g., MPEG-2 bitstream); (b) an output path for outputting decoded discrete cosine transform coefficients (in a form that can be decoded by an inverse discrete cosine transform unit); and (c) a quantization matrices unit which provides quantization matrices used in performing the inverse quantization function and includes an interface for receiving specific quantization matrix values from the sequence of encoded video data.

From an operational perspective, the inverse quantization unit includes (a) an inverse quantization pipeline which accepts encoded discrete cosine transform coefficients as inputs and performs inverse quantization on the discrete cosine transform coefficients with weighting factors from one or more inverse quantization matrices; (b) a quantization matrices unit, having an interface as described above, which provides arrays of values corresponding to the weighting factors of inverse quantization matrices; and (c) a row/column generator for generating indicia of a current row and column within the inverse quantization matrices, which current row and column defines a current weighting factor from the quantization matrices unit to be multiplied by a current encoded discrete cosine transform coefficient provided in the inverse quantization pipeline. In this manner, the row/column generator performs an inverse scan function so that the encoded discrete cosine transform coefficients are operated on in the order dictated by the matrix format employed to encode the video data. Note that the inverse scan may take on two formats according to the MPEG standard. The quantization matrices unit should provide four quantization matrices—a default matrix for intra-coded blocks, a default matrix for non-intra-coded blocks, a user-defined matrix for intra-coded blocks, and a user-defined matrix for non-intra-coded blocks—to comply with the MPEG standard.

Preferably, the inverse quantization unit pipeline includes the following independent blocks which operate on the encoded discrete cosine transform coefficients in the manner specified by the ISO/MPEG-2 standard: (i) a sign correction unit having a multiplier for multiplying the encoded discrete cosine transform coefficients by two and adding a sign correction factor to the multiplication product; (ii) a matrix multiplier which multiplies the output of the sign correction unit by appropriate weighting factors from the appropriate inverse quantization matrix; (iii) a division unit which divides the output of the matrix multiplier by 32; and (iv) a saturation and mismatch control unit which saturates and performs mismatch control on the output of the division unit.

Preferably, the quantization matrices unit includes (i) a default inverse quantization matrix unit (preferably a state machine) which generates weighting factors from a default quantization matrix; (ii) a second inverse quantization matrix unit which stores weighting factors from a second quantization matrix; (iii) a quantization scale generation unit (preferably also a state machine) for generating scalar values to be multiplied with the weighting factors; and (iv) logic for determining which quantization matrix should be used for multiplication with the current encoded discrete cosine transform coefficients in the pipeline.

As explained in more detail below, the above inverse quantization unit architecture may accept one encoded discrete cosine transform coefficient per clock cycle. Thus, the data lines can be made relatively thin and routing can be accomplished with relative ease. In a preferred embodiment, no data path in the inverse quantization unit is greater than 32 bits wide.

The inverse discrete cosine transform unit performs an inverse discrete cosine transformation on decoded discrete cosine transform coefficients provided from the inverse quantization unit.

The motion compensation unit performs both right and down half pel correction on pixel values from previously decoded video data. In a preferred embodiment the half pel compensation unit may be characterized as including: (1) a word path for accepting a group of adjacent pixel values from a row of pixel values (typically four adjacent pels are make up the group), the group of pixel values having an even number of members; (2) a single value path for accepting one pixel value from the row of pixel values; and (3) a half pel compensation unit in communication with the word path and the single value path. The half pel compensation is adapted to concurrently accept and perform right half pel compensation on the group of adjacent pixel values together with the one pixel value. The benefit of this architecture is that the half pel compensation unit can perform right half pel compensation on two different sized groups of pixel values. In right half pel averaging, an "odd" pixel value must be averaged for every row. In an especially preferred embodiment, the word path accepts four pixel values concurrently. Thus, the half pel compensation unit can accept five values when averaging the right-most pixels of the row, and can accept four values when averaging the remaining pixels in the row.

In one embodiment, the half pel compensation unit includes: (i) a first group of four adders which perform right half pel averaging on as many as five pixel values; (ii) a line buffer for temporarily storing right half pel average values produced by the first group of adders; and (iii) a second group of four adders which perform down half pel averaging between values stored in the line buffer and values produced by the first group of adders. Values that have right and/or down half pel averaged are provided from the half pel compensation unit to a compensation RAM which is adapted to store a full block of pixel values. Preferably, the compensation RAM has 32 by 64 bits of storage capacity.

The motion compensation unit should also include a B picture compensation unit for averaging forward and backward motion references in B-coded macroblocks. The B picture compensation unit will be in communication with the compensation RAM and the half pel compensation unit, such that forward reference pixel values stored in the compensation RAM are averaged with backward reference pixel values provided from the half pel compensation unit. Preferably, the B picture compensation unit has four adders which allow it to average four pixel values at any one time.

These and other features and advantages of the invention will be described in more detail below with reference to the drawings.

DETAILED DESCRIPTION OF THE PREFERRED EMBODIMENTS

A. Application of Invention to Cores

Figure 1A:
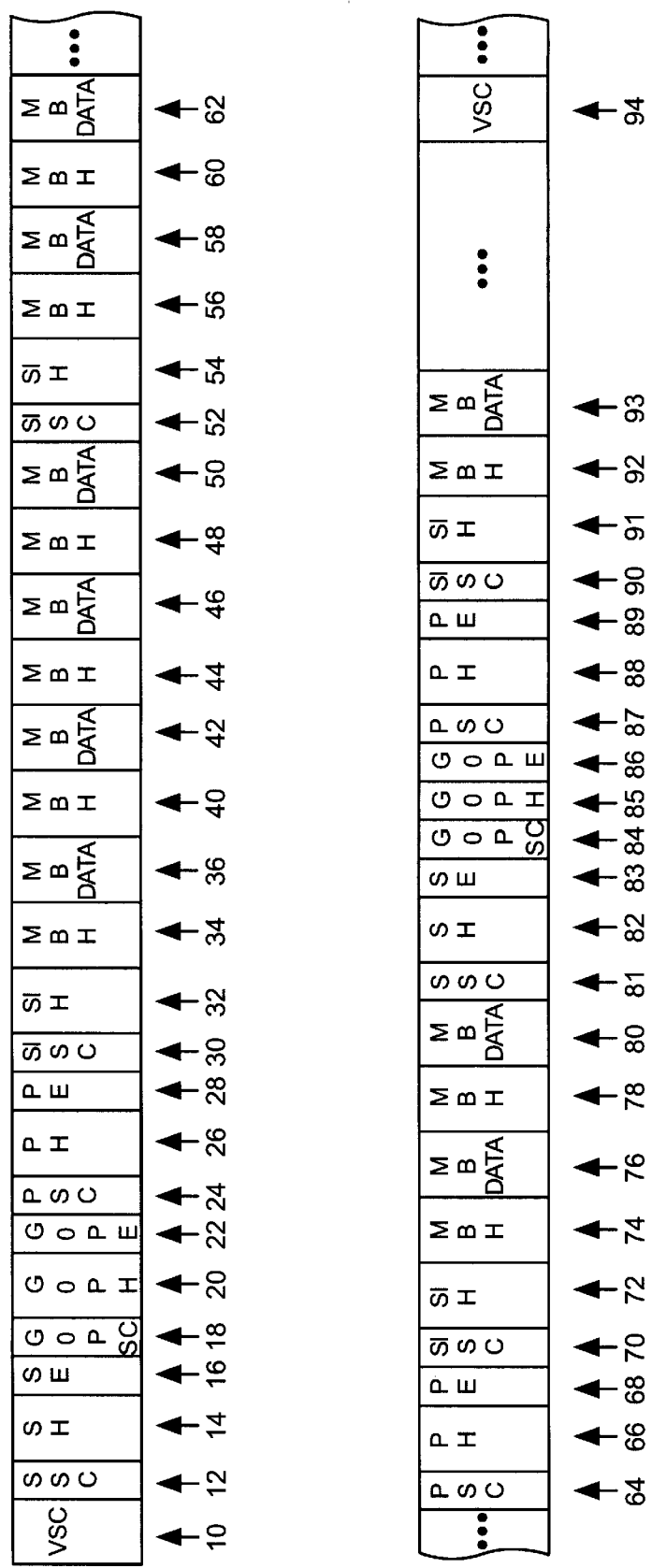
FIG. 1A is a diagram of a bit stream containing video data encoded according to the MPEG-2 standard.

The present invention pertains to integrated circuit cores which implement at least some of the MPEG-2 video decoding requirements. As used herein, a "core" is the hardware layout of a substantially self-contained integrated circuit module such as a CPU, an Asynchronous Transfer Mode (ATM) unit, a memory unit, a network interface, an audio decoder, and, the subject of this invention, a video decoder. The physical core has associated therewith a core design which specifies a collection of mask layouts used to generate the reticles for photolithography steps employed during integrated circuit fabrication. The core design also includes certain processing parameters associated with masks, such as ion implant energy and dose, etch conditions, oxidation conditions, chemical vapor deposition conditions, etc. Still further, the core design includes information specifying the core interface parameters such as the types of input and output signals required, the locations of the various interface connections, etc.

Some enterprises maintain a libraries of cores, with each core of each library including the design information provided above. For example, LSI Logic Corporation of Milpitas California maintains a CoreWare® library having multiple cores. Designers working with this library can employ one or more of the cores in designing chips for new applications. Such libraries provide competitive advantages to enterprises that make custom integrated circuits such as multi-core systems on a single semiconductor chip. Often such custom chips are not expected to sell in huge volume (at least as compared to CPU microprocessors for personal computers, for example). Thus, their design costs must be kept to a minimum. This can be accomplished by working with an enterprise that has an appropriate core design available for integration into the customer's chip design because the core need not be designed from scratch; the designer simply sets aside a "black box" reserved for the core within its larger integrated circuit design.

As noted, core design libraries facilitate design of complex multi-functional "systems on a chip" including multiple cores integrated on single semiconductor chip. For instance, a single system on a chip might include a microprocessor core, a video decoder core, and an audio decoder core: all taken from library of core designs. A system designer is left with the task of integrating the various cores on a single chip and providing any processing functionality not specified in the core designs.

The MPEG-2 video decoder core designs of the present invention possess the benefits of core designs generally as described above. Preferably, though not necessarily, the video decoder core designs of this invention are provided as part of a larger library of core designs as described above.

While the present invention relates primarily to video core designs and hardware, it also relates to methods of using the core designs in computer aided design of chip systems. Further, the invention relates to an apparatus for performing these operations. This apparatus may be specially constructed for the required purposes, or it may be a general purpose programmable machine selectively activated or reconfigured by a computer program stored in memory. The designs and methods presented herein are not inherently related to any particular computer or other apparatus. In particular, various general purpose machines may be used with programs written in accordance with the teachings herein, or it may be more convenient to construct a more specialized apparatus to perform the required method steps.

Still further, the present invention relates to machine readable media on which are stored (i) the video core layout parameters and/or (ii) program instructions for using video core in performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

B. MPEG-2 Decoding Process

As the present invention preferably implements portions of the MPEG-2 video decoding algorithm, the general MPEG-2 video decoding algorithm will now be briefly described with reference to FIGS. 1A, 1B, and 1C. For purposes of the following discussion, it will be assumed that the reader has available a copy of the ISO's MPEG-2 standard ISO/IEC 13818-2:1995(E), previously incorporated herein by reference. This document may be obtained from ISO/IEC, Case Postale 56, CH-1211, GENEVA 20, Switzerland.

Compressed video data is generally transmitted as a bit streams of "ones" and "zeros" representing coded data. In MPEG-2, bit streams are typically divided into packets of data, and each packet is configured to have a start code indicative of either video, audio or synchronization data. By way of example, a video packet may begin with twenty three consecutive zeros "0," followed by a "1," and then followed by an identifying "byte" which may designate the current packet as either video, audio or synchronization data.

The following is a brief description of the architectural hierarchy associated with a packetized video bit stream as described in the ISO/MPEG-2 Document. While this description presents the example of an NTSC video standard (employing a resolution of 720 by 480 pixels), the invention also covers other standards such as the PAL video standard (employing a resolution of 720 by 576 pixels).

When a decoder receives a video packet, the video packet begins with a start code. The outer most level of the hierarchy begins at a "sequence" level, which includes one or more coded frames that have some pixel data commonality. An example of pixel data commonality between frames may be represented as an identical blue sky background associated with filming an air show.

The next level in the video bit stream hierarchy is a "group of pictures" (GOP) level. The GOP level typically includes a group of about 4 to 5 frames (an amount sufficient to allow humans to perceive a change in image) also having some pixel data commonality. Following the GOP level is a "picture" level. As noted, a picture in MPEG-2 is defined as a frame having a grid of 720-by-480 pixels. At a level below the picture level is a "slice" level. A slice level is defined as series of one or more groups of 16-by-16 pixels that are aligned in horizontal rows about a frame. In general, slices are used to identify specific regions of pixel data that are common between successive frames. As described in FIG. 6–8 of the ISO/MPEG-2 Document, a picture may be carved into several slices. Below the slice level is a "macroblock" level which identifies a square block of 16-by-16 pixels. Thus, a single 720-by-480 MPEG-2 frame includes 1350 macroblocks arranged as 45 to a row over 30 rows. As will be described in greater detail below, each macroblock includes four 8-by-8 pixel "luminance" blocks, and two 8-by-8 "chrominance" blocks (denoted chroma red and chroma blue).

Figure 1B:
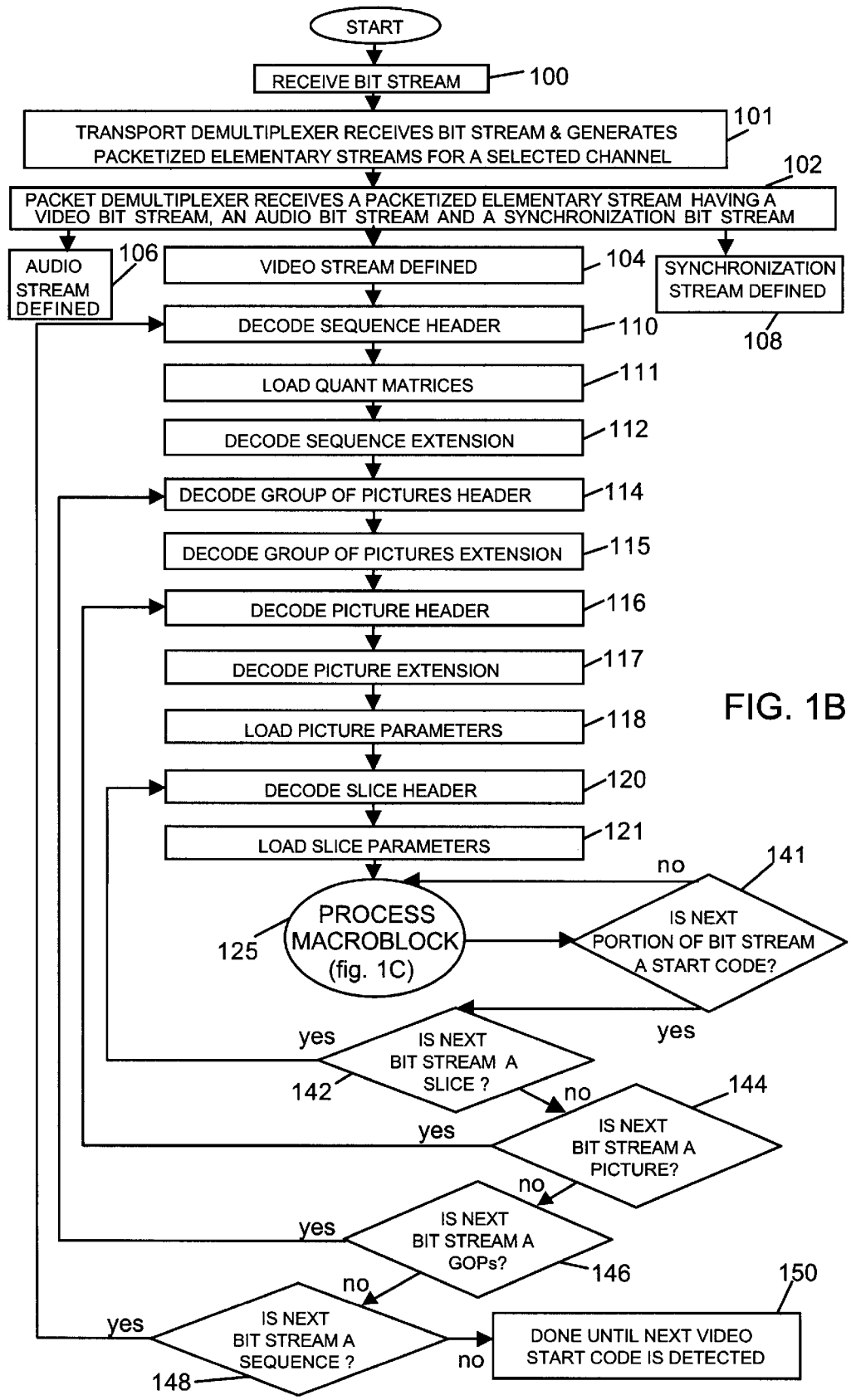
FIG. 1B is a process flow diagram of the video decoding component of an MPEG-2 decoder operating in accordance with this invention.
Figure 1C:
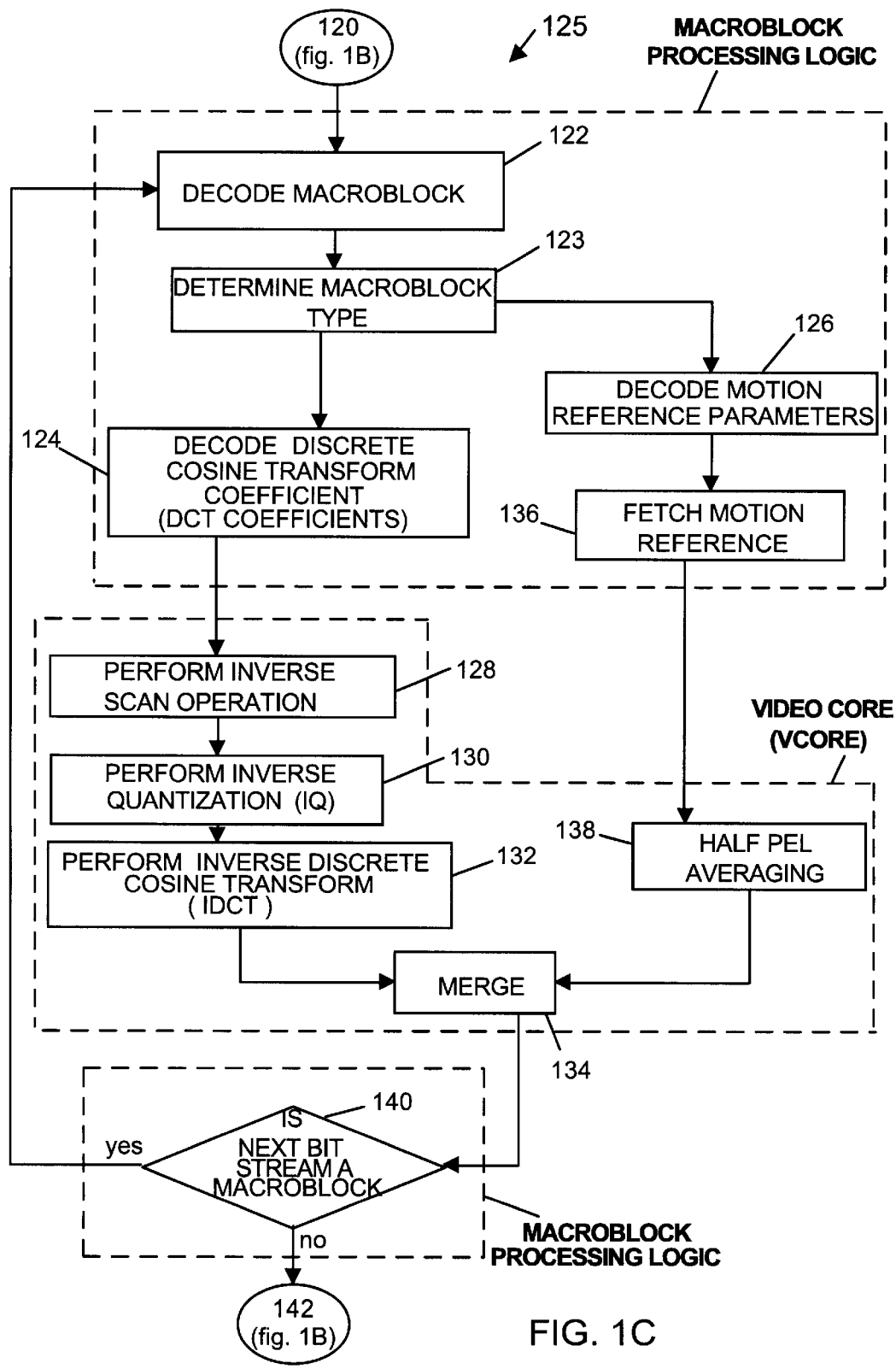
FIG. 1C is a process flow diagram detailing the steps of generating an image of a macroblock and showing which steps are performed by a video decoder core of this invention.

FIGS. 1A through 1C illustrate the method by which an MPEG-2 decoder receives a compressed digital bit stream and decompresses that bit stream using a combination of firmware/software and hardware cores (including the video core of this invention). FIG. 1A shows an exemplary MPEG-2 video bit stream that must be decoded, and FIGS. 1B and 1C present the method steps employed by a decoder to decode the video information in the bit stream. In a preferred embodiment, the video core of this invention implements certain of the steps illustrated in FIG. 1C, while firmware carries out the method steps described in FIG. 1B. The microarchitecture of the video core will be described in greater detail in FIGS. 3 to 6.

The method of FIG. 1B begins at a step 100 where a digital bit stream is received. Next, the method proceeds to a step 101 where a transport demultiplexer receives the bit stream. The transport demultiplexer functions as a selection mechanism which allows the identification and selection of a particular channel. The channel selection process is necessitated since the bit stream received at step 100 may include bit stream data for a number of different channels, each of which may contain independent content. Once a particular channel is selected, the transport demultiplexer routes an elementary bit stream for the selected channel. Consequently, the bit stream data information associated with unselected channels is simply disregarded during the decoding process.

The method then proceeds to a step 102 where a packet demultiplexer receives the elementary bit stream generated at step 101. The packet demultiplexer is generally designed to identify and sort the elementary bit stream into audio packets, video packets or synchronization packets. By way of example, once sorted, the audio data will be diverted through an audio bit stream path 106, the video data will be diverted through a video bit stream path 104 and the synchronization data will be diverted through a synchronization bit stream path 108. Since the present invention is directed to video decoding, the remaining discussion will be limited to the steps associated with decoding the video bit stream.

For illustration purposes, a hypothetical packetized video bit stream is shown in FIG. 1A. The video bit stream begins with a video start code (VSC) 10. Following VSC 10 is a sequence start code 12 indicating the beginning of a new sequence. Sequence start code 12 is then followed by a sequence header 14. As is well known in the art, headers provide decoders with additional identifying characteristics about particular video data pertaining to the sequence (or other video unit) associated with the header.

Returning now to FIG. 1B, the method continues from step 104 to a step 110 where sequence header 14 is decoded. As described in the ISO/MPEG-2 Document, a sequence header may contain a variety of identifying information such as horizontal picture size, vertical picture size, frame rate code, the bit rate code, quantization matrix information, etc. Once sequence header 14 is decoded, the method will proceed to a step 111 where a quantization matrix identified in sequence header 14 is loaded into a predefined memory location on a hardware video core (sometimes referred to herein as the VCORE). The VCORE architecture of the present invention will be described in greater detail in the discussion of FIG. 3.

Next in the method, a sequence extension 16 is decoded at a step 112. As shown in FIG. 1A, the sequence header is followed by a sequence extension 16. As described in the ISO/MPEG-2 Document, extensions are optional, but when employed provide additional identifying information beyond that provided by a header.

Sequentially following sequence extension 16 in the FIG. 1A bit steam are a group of pictures (GOP) start code 18, a GOP header 20 and a GOP extension 22 (optional). To handle these items, the method of FIG. 1B proceeds to a step 114 where GOP header 18 is decoded as described in the ISO/MPEG-2 Document. From step 114, the method proceeds to a step 115 where GOP extension 22 is decoded. Sequentially following the GOP extension 22 of FIG. 1A are a picture start code 24, a picture header 26 and a picture extension 28. The method of FIG. 1B handles these items by first proceeding to a step 116 where picture header 26 is decoded. Thereafter, the method proceeds to a step 117 where picture extension 28 is decoded. Once the picture header and extensions are decoded, the method proceeds to a step 118 where picture parameters identified in the decoded picture header 26 are loaded onto predefined memory locations in the VCORE.

Following picture extension 28 (of FIG. 1A), is a slice start code 30, and a slice header 32. The method of FIG. 1B therefore proceeds to a step 120 where slice header 32 is decoded. After decoding slice header 32, the method proceeds to a step 121 where slice parameters identified in the decoded slice header 32 are loaded onto predefined memory locations in the VCORE. As shown in FIG. 1A, slice header 32 is followed by a macroblock header 34 and macroblock data 36. As used herein, "macroblock data" 36 signifies the actual luminance and chrominance data associated with the currently processed macroblock.

As shown in FIG. 1B, the macroblock data is processed at a step 125. This step is detailed in FIG. 1C. As shown there, each macroblock processing step is implemented in one of two separate hardware cores (in accordance with a preferred embodiment of the present invention). The first hardware core is a "macroblock processing logic," which does not form part of the present invention, and the second hardware core is the VCORE of this invention. While the steps identified as being implemented in the macroblock processing logic are preferably implemented in a single hardware core, there is in principle no reason why they could not be implemented in software or firmware, or in custom-made hardware, or divided between various hardware cores, etc.

Before the turning to the details of macroblock processing, it should be understood that one type of MPEG-2 macroblock (which is the type decoded in a preferred embodiment of the present invention) may be defined as being a "4:2:0" macroblock which means that the macroblock includes exactly 6 blocks, four of which contain luminance data and two of which contain chrominance data. Each such block includes an 8-by-8 matrix of pixel data values. The four blocks of luminance data each populate one corner of the 16-by-16 macroblock. Thus, there is a one-to-one correspondence between macroblock pixels and luminance block pixels. For each chrominance block, however, there is not a one-to-one correspondence with the macroblock pixels. In fact, chrominance data is provided at a lower resolution than luminance data. Specifically, the 64 (8-by-8) chrominance values in each chrominance block are spread over the entire region subsumed by the 256 (16-by-16) macroblock pixels.

Now macroblock data is provided in the bitstream, one block at a time. According to the ISO/MPEG-2 Document, the four luminance blocks are decoded first, in sequence, before the two chrominance blocks are decoded, in sequence. Each block to be decoded is provided as compressed data which must be decoded as follows.

While initially in the macroblock processing logic (FIG. 1C), the method proceeds to a step 122 where the current macroblock header 34 is decoded. Once macroblock header 34 is decoded, the method proceeds to a step 123 where it is determined whether the current macroblock is "intra coded" or "non-intra coded." This determination is made by referring to the picture level header. Briefly, an intra coded macroblock must be reconstructed from scratch, without reference to other macroblocks. This is, of course, computationally intensive. A non-intra coded macroblock, in contrast, may be reconstructed by using reconstructed data from previous (or previous and future) reference frames, thus providing substantial computational savings.

If the macroblock is intra coded, then each block comprising that macroblock must be treated according to the MPEG-2 algorithm for intra coded blocks. If, however, the macroblock is determined to be non-intra coded, then each block must be treated according to the MPEG-2 algorithm for non-intra coded blocks. In addition, some block in the non-intra coded macroblock may also have to be treated according the algorithm for intra coded blocks in order to correct for certain "errors." Which blocks within a non-intra coded macroblock must also be treated by the intra coded algorithm is determined by an MPEG-2 parameter known as the coded_block_pattern (CBP). The CBP identifies which specific blocks in the current macroblock must be treated by both the intra and non-intra coded algorithms. This parameter is loaded into the VCORE when the macroblock header is decoded.

If it is determined at step 123 that the current macroblock is intra coded (or the CBP determines that a current block should be treated by the intra coded algorithm), the method will then proceed down an intra coded path (steps 124, 128, 130, and 132). On the other hand, if it is determined that the current macroblock is non-intra coded, then a motion compensation process must be performed (steps 126, 136 and 138).

Focusing first on the intra coded pathway, a step 124 initially decodes the incoming bit stream to produce discrete cosine transform (DCT) coefficients. This involves one or more MPEG-2 steps such as variable length decoding. The result is an output of partially decoded DCT coefficients (64 per block) each of 12 bit width. These values are passed from the macroblock processing logic to the VCORE where a step 128 performs an inverse scan operation to correlate each incoming encoded DCT coefficient with a particular location in an 8-by-8 matrix as described in section 7.3 of the ISO/MPEG-2 Document.

Once the inverse scan operation is performed, the method proceeds to a step 130 where an inverse quantization step is performed. An inverse quantization step generally involves multiplying each DCT coefficient by the appropriate weighting factor from locations in one of two weighting matrices. In general, one weighting matrix is used for intra coded macroblocks and another is used for non-intra coded macroblocks. Once the inverse quantization step is complete, the method proceeds to a step 132 where an inverse discrete cosine transform ("IDCT") is performed. As described in section 7.5 of the ISO/MPEG-2 Document, the IDCT operation is performed to convert the block data from frequency space to Cartesian space.

Turning now to the non-intra coded pathway (steps 126, 136, and 138), block data is processed according a "motion compensation" algorithm. As described in the ISO/MPEG-2 Document, a macroblock that is non-intra coded may require motion compensation for those blocks that reference past and/or future frame information. By way of example, a non-intra coded block may rely on information from frames in the past. This is called a predictive "P" motion compensation. In addition, a non-intra coded block may also rely on information from both past and future frames. This is called a bi-directional "B" motion compensation.

A block from a non-intra coded macroblock is initially processed at a step 126 where the motion reference parameters such as a motion vector pointing to a location in a past or future macroblock are decoded. Once the motion reference parameters are decoded, the method proceeds to a step 136 where a motion reference (reconstructed block data from a past or future frame) is fetched from already reconstructed frames which are stored off-chip. This process is preferably controlled by a separate "reference logic" block residing outside the video core.

As shown, steps 126 and 136 are performed in the macroblock processing logic. The resulting processed macroblock information passes to the VCORE of the present invention. At this point, a half-pel averaging step is performed at a step 138. Half-pel averaging is described in section 7.7 of the ISO/MPEG-2 Document. Once the half pel averaging is complete at step 138 and the IDCT step is complete at step 132, the method proceeds to a step 134 where a merge operation is performed. The merge operation only really applies in the case where a non-intra coded block is processed with an "error" handled by the intra coded pathway. In such cases, the merge operation combines the macroblock information passing through the intra coded path and the macroblock information passing through the motion compensation path.

By this point, macroblock header 34 and macroblock data 36 (of FIG. 1A) have now been processed through the steps embodied in the VCORE of FIG. 1C. After the merge operation of step 134 is complete, the method then determines, in a step 140, whether the next portion of the bit stream defines another macroblock. In the exemplary bit stream provided in FIG. 1A, the next portion of the bit stream contains a macroblock header 40. Consequently, the method will again march through the macroblock processing logic and VCORE as described above. Specifically, the method will march through the above described steps for the next two sets of macroblock headers 44, 48 and macroblock data 46, 50 of FIG. 1A.

The method then continues to process the macroblocks through the macroblock processing logic and VCORE of FIG. 1C until the next portion of the bit stream no longer provides macroblock data. This event is noted in the bit stream by a start code for the next slice, picture, etc. Thus, as macroblocks are processed as shown in FIG. 1C, the system is constantly checking for the presence of another start code in the bit stream as indicated by decision step 141 in FIG. 1B. If there is no start code, the process simply returns to decoding macroblocks as indicated in FIG. 1C.

As shown in FIG. 1A, a slice start code is shown following the last macroblock. Thus, when the method again proceeds to step 141, it will be determined that the next portion of the bit stream contains a start code, and the method will then proceed to a step 142 of FIG. 1B. At step 142, it is determined whether the next portion of the bit stream contains slice information. Since the next bit stream item is a slice start code 52, the method will proceed to step 120 where the slice header is decoded. Once the slice header is decoded as described above, the method proceeds to step 121 where the slice parameters identified in the decoded slice header are loaded onto predefined memory locations on the VCORE. From step 121, the method will again proceed according to the steps shown in FIG. 1C. Specifically, macroblock headers 56 and 60 and macroblock data 58 and 62 will be processed through macroblock processing logic and VCORE as described above.

Once the last two macroblocks identified in the bit stream have been processed, the process flow will return to step 142 of FIG. 1B where it is determined whether the next bit stream item contains slice information. As shown in FIG. 1A, the next bit stream item is picture information 64, so the method proceeds to a step 144 where it is determined whether the next bit stream is a picture. Since the next bit stream item contains picture information, the method will then proceed through steps 116 to 121 (of FIG. 1B) where the bit stream information identified in 66, 68, 70, and 72 of FIG. 1A is processed. When the bit stream reaches a macroblock header 74, the method will then proceed to FIG. 1C where macroblock headers 74, 78 and macroblock data 76, 80 are processed. As described above, FIG. 1C processes the macroblocks through the macroblock processing logic and the VCORE until the next identified bit stream item is no longer a macroblock.

As shown in FIG. 1A, the next bit stream item is a sequence start code 81. Note that there is typically only a single sequence start code in a given video packet. However, to further illustrate the workings of this method, sequence start code 81 is shown as part of a single video packet.

After encountering start code 81, the method marches through decisions steps 142, 144 and 146 where each will be answered in the negative. The method will then proceed to a step 148 where it is determined whether the next portion of the bit stream describes a new sequence. Since the next bit stream item is sequence start code 81, the method flow returns to step 110. As described above, the method will then proceed from step 110 through step 121 (of FIG. 1B) where the bit stream information identified in blocks 81 to 91 of FIG. 1A are processed. Next, the method will proceed to FIG. 1C where a macroblock header 92 and a macroblock data 93 are processed in the macroblock processing logic and VCORE as described above.

The method then continues to process any received bit stream information and complete the method steps of FIG. 1B on firmware, and the method steps of FIG. 1C on the macroblock processing logic and VCORE until a new video start code (VSC) 94 is received as indicated at a step 150.

C. Video Core Layout

Some approaches to implementing MPEG-2 video decoding have relied upon a general purpose CPU and software/firmware for performing all specified decoding steps. Unfortunately, this is not the most efficient way to handle the computationally intensive steps of the MPEG-2 decoding algorithm. Further, to the extent that the CPU must be employed to perform the decoding steps, it is unavailable to perform other processing required by the system. Alternate previous approaches have relied entirely on custom hardware having a microcontroller which microsequences the control functions.

In contrast, the present invention segregates some computationally intensive MPEG-2 decoding functions in dedicated hardware (the video core), while allowing other less computationally intensive functions to be performed outside the core by a general purpose CPU for example. Thus, an IC designer is at liberty to develop specific processing capabilities for those MPEG-2 decoder functions not in the video core. Individual customers can employ the video core of this invention and focus their design efforts on decoder functions such as run length decoding, and thereby develop a market niche on the basis of such specialization.

Figure 2:
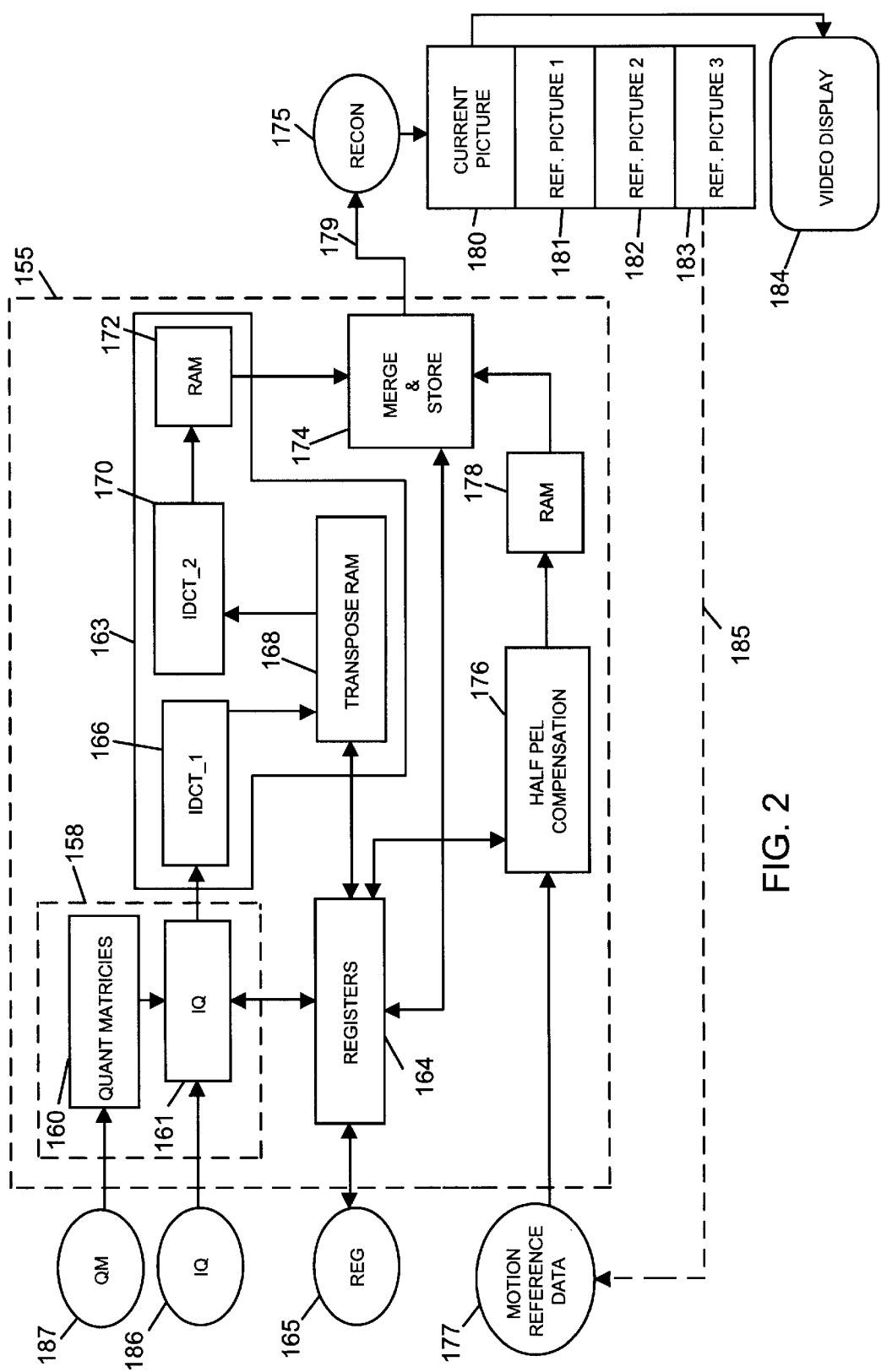
FIG. 2 is a block diagram illustrating the major hardware blocks of a video core designed in accordance with this invention.

One preferred architecture for a video decoder core 155 of the present invention is depicted in FIG. 2. This architecture includes an inverse discrete cosine transform pipeline (including blocks 161, 166, 168, 170, and 172) and a motion compensation pipeline (including blocks 176 and 178). Intra-coded (I) blocks are passed through the IDCT pipeline, while non-intra coded (B and P) blocks are passed through the motion compensation pipeline. Pixel data from the IDCT and motion compensation pipelines are combined as necessary in a merge and store unit 174.

As mentioned in the discussion of the MPEG-2 algorithm, a macroblock may be either intra-coded (I) predictive (P), or intermediate (B). Intra-coded macroblocks are decoded pixel-by-pixel without the benefit of the information from previously decoded video frames. Predictive macroblocks employ data provided in a previous video frame, possibly with some additional processing to compensate for any change between the previous frame and the current frame.

Video core 155 communicates with the remainder of the MPEG-2 processing apparatus via five interface paths: a slave CPU interface path 187 for quantization matrix download, an I/O path 165 for register access, an input path 186 for coefficient data, an input path 177 for motion compensation data, and an output path 179 for decoded samples.

As shown in FIG. 2, the video decoder core 155 includes an inverse quantization unit 158 including an IQ unit 161 which receives 12 bit encoded DCT coefficients from outside the video core (IQ interface 185). These DCT coefficients have been variable length decoded in step 124 and are ready for inverse quantization. IQ 161 contains the hardware for performing the inverse scan step (step 128 of FIG. 1C) and the inverse quantization step (step 130 of FIG. 1C). After IQ unit 161 receives the encoded DCT coefficients from outside the video decoder core, it multiplies the coefficients by an appropriate scalar value obtained from a quantization matrices storage unit 160 of inverse quantization unit 158. Subsequent arithmetic manipulation of the encoded DCT coefficients in unit 161 produces modified DCT coefficients which are fed coefficient-by-coefficient to an inverse DCT unit 163.

The quantization matrices storage unit 160 stores two groups of user defined values used by IQ unit 161—one for intra coded macroblocks and the other for non-intra coded macroblocks. These matrix values are obtained through a QM interface 187 from the picture header at step 110 of decoding sequence header. Additionally, unit 160 provides two default matrices which are not extracted from the video bitstream. As each encoded DCT coefficient is processed by unit 161, it is multiplied by the appropriate matrix multiplier chosen from the quantization matrices storage unit 160.

Appropriate logic in unit 161 selects the matrix multiplier based upon a matrix scan algorithm. The particular inverse scan algorithm employed (typically a zig-zag scan) is one of two specified by the ISO/MPEG-2 Document in section 7.3.

The DCT coefficients provided from unit 161 are inverted (step 132 of FIG. 1C) in two dimensions by the inverse DCT unit 163 which includes an inverse DCT_1 unit 166, a transpose RAM unit 168, an inverse DCT_2 unit 170, and an IDCT output storage RAM 172. Specifically, the first stage of the two dimensional IDCT is performed by IDCT_1 unit 166. The results are stored in the transpose RAM 168, where they may be addressed in such a manner as to effect a transpose operation.

The partial sum of the products is computed in the order that the DCT coefficients are received (i.e., in the order specified by the inverse scan). The constants required for this first stage of the 2-D IDCT are provided by a state machine, so no extra ROM is necessary and space is conserved in the video core. The transpose RAM 168 stores intermediate results of the 2-D IDCT process. Preferably, the transpose RAM 168 is a 2×16×60 bits dual port RAM. The IDCT_1 unit 166 writes in one partition and the IDCT_2 unit 170 reads from another partition.

The second stage of the two dimensional IDCT process is performed by IDCT_2 unit 170 which reads result of IDCT_1 unit 166 from the transpose RAM 168. The second dimension row results are computed first. As for the first dimension, the constants necessary for computations are provided by a state machine, as opposed to a ROM to conserve space within the video core.

The output from IDCT_2 unit 170 is stored as blocks of pixel values in a 32×32 byte RAM block 172. It should be understood that the hardware blocks of video decoder core 155 described so far (i.e., inverse quantization unit 161, IDCT_1 unit 166, transpose RAM 168, IDCT_2 unit 170, and storage RAM 172) together perform the operations for decoding intra-coded macroblocks.

The values stored in RAM block 172 are provided to a merge and store unit 174 at appropriate times. If the information stored in RAM 172 is part of an I macroblock, that information is simply passed through merge and store unit 174 to outside the video core where it is used to construct the current macroblock for display. If, however, the information stored in RAM 172 is part of an error correction for P or B macroblocks, then it must be merged with motion compensation data in merge and store unit 174 as described below.

Reconstructed macroblock pixel values from merge and store unit 174 are passed block-by-block outside the video core to a frame reconstruction unit 175 which is used to reconstruct the decoded blocks into macroblocks and assemble the macroblocks into frames. From reconstruction unit 175, the pictures are sent to a buffer including a picture storage area 180 reserved for the most recently reconstructed frame. The current picture is then displayed in video display 184 at 30 Hz. Representative storage areas 181, 182, and 183 reserved for previously displayed pictures. The pictures remain in these storage areas outside the video core for a period of time long enough to be used in any subsequent P or B macroblocks.

All P or B coded macroblocks pass through the motion compensation pipeline. Specifically, when a P or B macroblock is encountered, information in registers 164 requires that pixel values from a previously decoded frame be provided to a half pel compensation unit 176. The required pixel values are provided from one of the temporary storage areas 181, 182, 183, etc. The particular frame and pixel values are specified by a motion vector of the macroblock being decoded. The identified pixel values are routed to the motion compensation pipeline along line 185 and through a motion reference data interface 177. From there the values reenter the video core in half pel compensation unit 176. This unit performs a half pel compensation on the retrieved macroblock as described at section 7.7 of the ISO/MPEG-2 Document. The resulting half pel averaged pixel values are stored in a 32×32 RAM unit 178 until they are forwarded to merge store and unit 174.

If any blocks of the P or B macroblock contain an error component, as indicated by the coded_block_pattern value stored in registers 164, then those error containing blocks, which are temporarily stored in RAM 178, are subsequently merged with error values from RAM 172 at merge and store unit 174. This serves to remove the error in the P or B blocks. The completed macroblock is then transferred out of the video core where it is assembled with other macroblocks to produce the current picture as described above.

The need for an error component arises when the video data in the macroblock is changing slightly but not radically from frame to frame. Thus, much of the information is preserved from frame to frame, but to compensate for the changes, some intra-coding is required. This coding is performed by providing the appropriate DCT coefficients through the IDCT pipeline. The result is a matrix of error correction values that are summed with the pixel values from the motion compensation pipeline in merge and store unit 174 to provide a corrected block of pixel values ready for transport out of the video core.

The registers 164 of video core 155 and register interface 165 pass various values used to specify various parameters required to operate the video core. For each macroblock being decoded, registers 164 store such information as the picture_coding_type (I, B, or P), whether the macroblock belongs to a field or a frame, inverse scan type, whether to use the loaded or default matrices, prediction type (i.e., whether motion compensation is forward or backward), the coded block pattern, half pel compensation parameters, and the status of the pipelines and units making up the video core.

1. The Inverse Quantization Unit

Figure 3A:
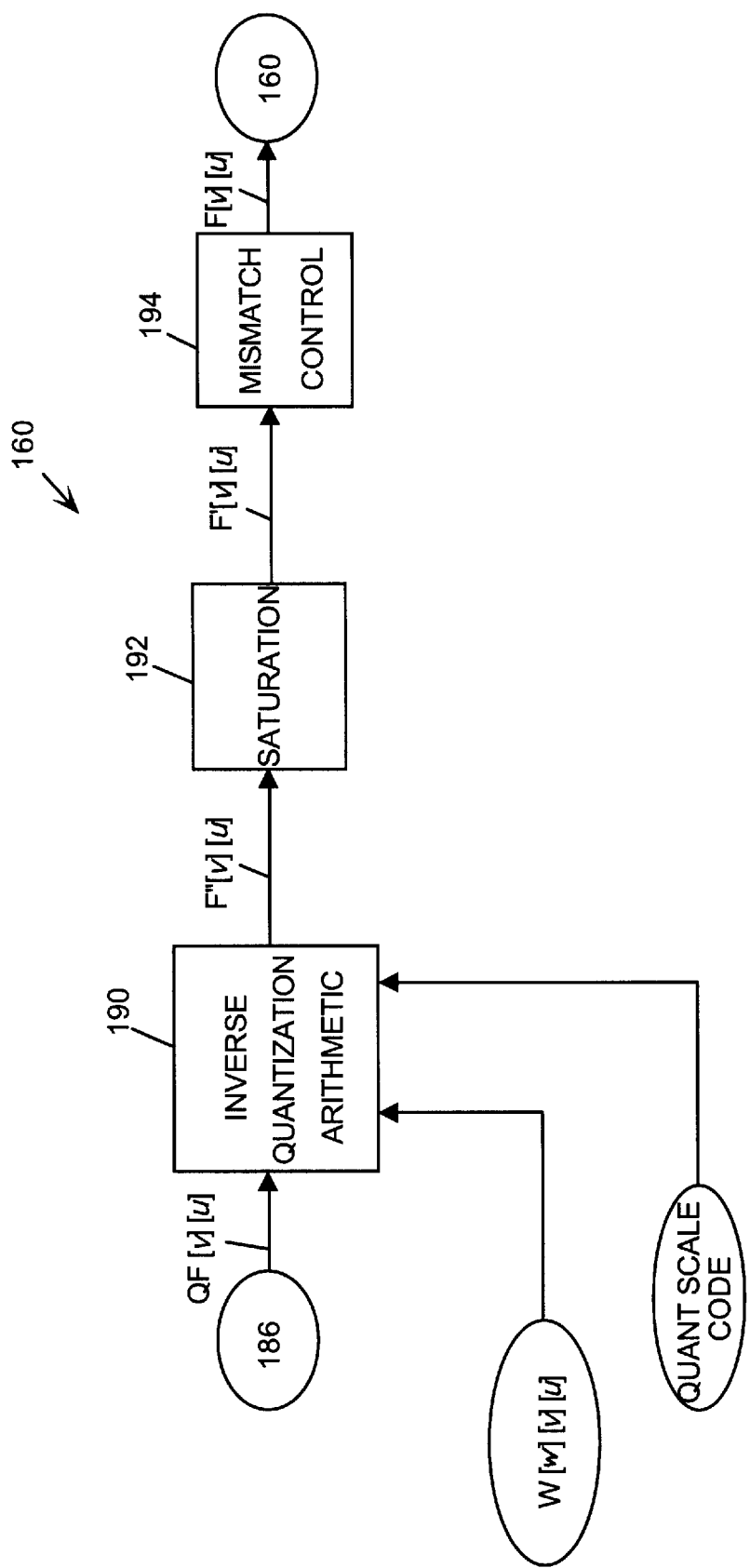
FIG. 3A is a block diagram of the three generic processing blocks of an inverse quantization unit as specified by the ISO/MPEG-2 standard.

FIG. 3A is a block diagram illustrating the generic processing blocks of inverse quantization pipeline 161 (shown in FIG. 2). It is a reproduction of FIG. 7-4 of the ISO/MPEG-2 Document and is provided here to illustrate the inverse quantization steps that must be implemented in a video core of the present invention. The inputs to inverse quantization unit 161 include a stream of encoded DCT coefficients and quantization matrix values (provided at step 111 of FIG. 1B), and the output is a stream of decoded DCT coefficients.

As shown in FIG. 3A, an inverse quantization arithmetic block 190 receives three inputs. It receives a matrix of encoded DCT coefficients QF[v][u] provided serially according to an inverse scan sequence (see section 7.3 of the ISO/MPEG-2 Document), a matrix of weighting factors W[w][v][u], and a quant_scale_code parameter loaded with the other macroblock parameters at step 122 of FIG. 1C. The inverse quantization arithmetic block 190 performs an arithmetic manipulation of the encoded DCT coefficients in accordance with the following reconstruction formula (see section 7.4.2.3 of the ISO/MPEG Document):

$$F''[v][u] = ((2*QF[v][u]+k)*W[w][v][u]*quantiser\_scale)/32$$

where:

$k = 0$ intra blocks $Sign(QF[v][u])$ non-intra blocks $Sign(QF[v][u]) = 1$, for $(QF[v][u]) > 0$ $Sign(QF[v][u]) = 0$, for $(QF[v][u]) == 0$ $Sign(QF[v][u]) = -1$, for $(QF[v][u]) < 0$.

The encoded DCT coefficients QF[u][u] are provided serially from the incoming data bit stream to be decoded. The index 'v' is the index for the vertical matrix dimension and 'u' is the index for the horizontal matrix dimension.

The weighting matrix W[w][v][u] is one of two types: one for intra macroblocks and the other for non-intra macroblocks. This is the situation contemplated by the ISO for 4:2:0 data. It should be understood that MPEG-2 supports other macroblock formats including 4:2:2 (having 4 luminance blocks and 4 chrominance blocks) and 4:4:4 (having 4 luminance blocks and 8 chrominance blocks), and the present invention may be applied to such formats. When the 4:2:2 or 4:4:4 macroblock formats are employed, four weighting matrices are used, allowing different matrices to be used for luminance and chrominance values. In the notation W[w][v][u], 'w' takes values of 0 to 3 indicating which of the matrices is being used, and 'v' and 'u' are the vertical and horizontal matrix dimensions as above.

Both the intra and non-intra weighting matrices have a default set of values which may be overwritten with user specified matrix values taken from the sequence header at step 110 of FIG. 1B. The default values of the weighting matrix are invariant in any encoded video data stream (see section 6.3.11 of the ISO/MPEG-2 Document).

The quant_scale_code is a value between 0 and 31 and is obtained from the slice header at step 120 of FIG. 1B (see sections 6.3.15 and 7.4.2.2 of the ISO/MPEG-2 Document). The quant_scale_code together with a parameter known as q_scale_type (encoded in the picture coding extension—FIG. 1B, step 118) specifies the value of "quantizer_scale" in the above expression. The value of "quantizer_scale" is defined in Table 7–6 of the ISO/MPEG-2 Document. This scale factor is used so that weighting factor magnitudes can be modified at the cost of only a few bits, as compared to encoding an entire new weighting matrix.

Note that the inverse quantization arithmetic is modified for the QF[0][0] coefficient. Specifically, F"[0][0]=QF[0][0] ×intra_dc_mult, "intra_dc_mult" can be any of four values (8, 4, 2, 1) depending upon the intra_dc_precision value which is present in the picture coding extension of the video bitstream. The intra_dc_precision is a 2 bit quantity and is written into a register of the video core.

After the inverse quantization arithmetic unit 190 has modified an encoded DCT coefficient as described, the resultant DCT coefficient F"[v][u] is saturated in a saturation block 192. This process simply involves clamping the value of F"[v][u] between −2048 and 2047. Thus, the output of saturation block 192, F'[v][u] is simply given by the following expressions (see section 7.4.3 of the ISO/MPEG-2 Document):

$$F'[v][u] = 2047 \; F''[v][u] > 2047$$

$$F'[v][u] = F''[v][u] \; -2048 \leq F''[v][u] \leq 2047$$

$$F'[v][u] = -2048 \; F''[v][u] < -2048$$

Finally, the output of saturation block 192, F'[v][u] is treated by a mismatch control unit 194 which performs mismatch control as described in section 7.4.4 of the ISO/MPEG-2 Document. As stated therein, mismatch control requires firstly that all the reconstructed, saturated coefficients, F'[v][u], in the block shall be summed. This value is then tested to determine whether it is odd or even. If the sum is even then a correction shall be made to just one coefficient; F'[7][7]. If the sum is odd, no correction is made. Thus, only the 64th coefficient of every block may be corrected. If correction is required, as indicated by an even sum, then 1 is subtracted from F'[7][7] if F'[7][7] is itself odd and 1 is added to F'[7][7] if F'[7][7] is itself even.

After any mismatch correction is performed as required, the final output of inverse quantization unit 161 is a decoded DCT coefficient, F[v][u]. This value may then be treated by the first module 166 of the inverse discrete cosine transform unit as described below.

Figure 3B:
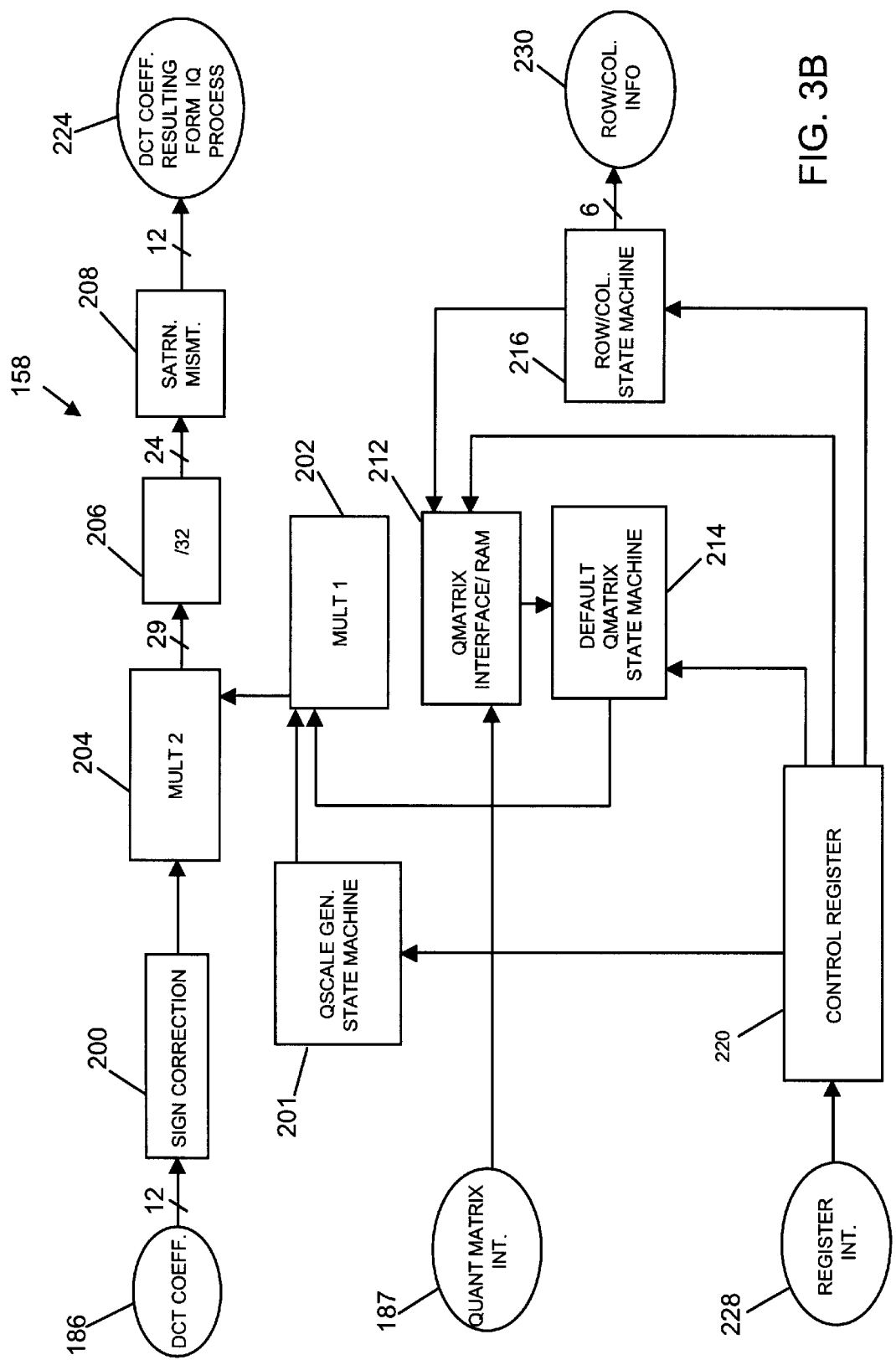
FIG. 3B is a block diagram showing the hardware elements of an inverse quantization unit in a video decoder core in accordance with a preferred embodiment of this invention.

One preferred micro-architecture for inverse quantization unit 158 will now be described in detail with reference to FIG. 3B. Inverse quantization unit 158 includes an inverse quantization pipeline having a sign correction unit 200, a second multiplier 204, a division unit 206, and a saturation and mismatch control unit 208. The encoded discrete cosine transform coefficients are provided through interface 186 to the inverse quantization unit 158 as 12 bit values (a 1-bit field at the most significant bit end defining the sign of the coefficient, and an 11-bit field defining the magnitude of the coefficient).

The sign correction unit 200 multiplies each encoded DCT coefficient by 2 and adds a factor "k" to the product. As indicated in the above expression of inverse quantization arithmetic from the ISO/MPEG-2 Document, the value of k is equal to 0 for intra-coded blocks and is equal to the 0, −1, or 1 depending upon the magnitude and sign of the DCT coefficient for non intra-coded blocks. (See Section 7.4.2 of the ISO/MPEG-2 Document). Sign corrected values output by sign corrected unit 200 are 14-bits wide. To perform its arithmetic tasks, sign correction unit 200 first performs a single left shift on the 12 bit input quantity to effectively multiply by 2. The output is a 14 bit value. Next, an accumulator unit adds or subtracts the value k. The output of this block is 14 bits.

The output from sign correction unit 200 is provided to the second multiplier 204 where it is multiplied by a weighting factor from the appropriate row and column of the appropriate quantization matrix. Second multiplier 204 may be a standard multiplier capable of multiplying an arbitrary 14-bit value (the output of sign correction unit 200) and an arbitrary 15-bit value (the appropriate value from a quantization matrix). The output of second multiplier 204 is a 28 bit value.

The output of second multiplier 204 is a 29-bit value which is provided to division unit 206 which divides the resulting value by 32 to reduce the size of the values being passed through the pipeline while maintaining an adequate number of significant digits. In a preferred embodiment, unit 206 accomplishes division by 32 by performing a five bit right-shift of the 29 bit input to truncate the five least significant bits from that value. Thus, the output from division unit 206 is a 24-bit value.

The 24-bit value output by division unit 206 is provided to saturation and mismatch control unit 208. The saturation part of this unit clamps the output by the second multiplier 204 so that the DCT coefficients have a maximum value of 2047 and a minimum value of a negative 2048. Thus, as described in Section 7.4.3 of the ISO MPEG-2 Document, saturation provides an output of 2047 for any input value greater than 2047, an output of a −2048 for any input less than a −2048, and an output equal to the input value for any input value between −2048 and 2047. Unit 208 simply strips off the less significant bits.

The mismatch control function of saturation and mismatch control unit 208 is described at Section 7.4.4 of the ISO MPEG-2 Document. As indicated therein, mismatch control applies only to the 64th value of every data block (for luminance blocks y0, y1, y2, and y3, and chrominance blocks Cr and Cb). Thus, 63 of every 64 values pass through mismatch control without modification. As for the 64th value (F'[7][7]), it passes through unmodified if the sum of all 64 values is an odd number. However, if the sum of the 64 values is an even number, the 64th value will have a value of 1 either added to or subtracted from it. One is subtracted from the value if the 64th value is itself odd. One is added to the value if the 64th value is itself even.

In a preferred embodiment, mismatch control is implemented by XORing the least significant bit of all 64 values in the block under consideration. The resulting XORed value (at the end of the 64th value) will be either odd or even. That is, the sum will be odd if the XORed value is one and the sum will be even if the XORed value is 0.

Based upon the determination made by the mismatch control logic, if the sum of the 64 values is even, then the least significant bit of F'[7][7] is toggled. Otherwise, F'[7][7] is passed through the mismatch control unit unmodified. The output of saturation and mismatch control unit 208 is a 12-bit value which is provided to the IDCT_1 unit 166 (FIG. 2).

Figure 3C:
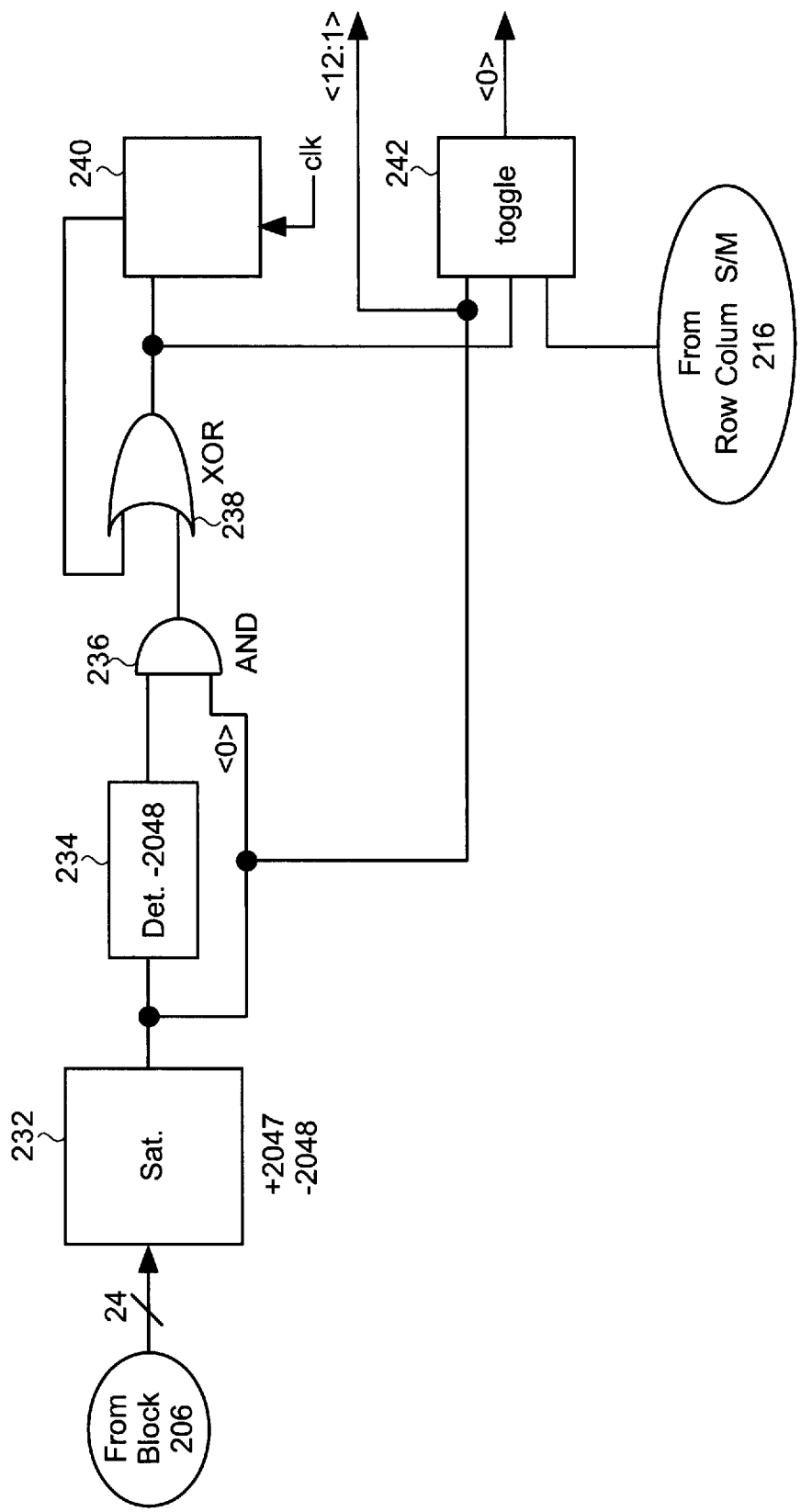
FIG. 3C is a block diagram showing the hardware elements of a mismatch control unit in a inverse quantization unit in accordance with a preferred embodiment of this invention.

A preferred implementation of saturation and mismatch control unit 208 is shown in more detail in FIG. 3C. The output of a saturation unit 232 will lie between −2048 and +2047 as required by the MPEG standard. The output of unit 232 is provided to detection unit 234 which produces the value 0 when the saturation output is −2048 and produces the value 1 at all other times. This ensures that a correct result is obtained when the value is −2048. In normal operation, an AND gate 236 outputs the least significant bit of the value from saturation unit 232. The output of gate 236 is then XORed with an output from a storage unit 240 by an XOR gate 238. The output of gate 238 is, in turn, stored in unit 240. The value in unit 240 specifies whether the running sum of the 64 block values is odd or even. If the value in unit 240 is 1, the sum is currently odd, and if the sum in unit 240 is 0, the sum is currently even. After the 64 values in each block have been processed, the storage unit 240 is, of course, cleared.

Row/column state machine 216 (FIG. 3B) identifies the last item of the block (the 64th value) where correction has to be done if the XOR output is 0 (sum is even). Assuming that the last item is currently in the mismatch control pipeline, then a toggle unit 242 outputs the value 1 as a least significant bit if its input bit (the least significant bit output from unit 232) is 0 and XOR gate 238 output is also 0. If, on the other hand, toggle unit 242 receives the value 1 as the least significant bit from saturation unit 232 while the XOR gate 238 output is 0, unit 242 outputs the value 0 as the least significant bit. If gate 238 output is 1 (sum is odd), no correction is done to the least significant bit.

As noted above, second multiplier 204 (FIG. 3B) multiplies the discrete cosine transform coefficient received from sign correction unit 200 with an appropriate matrix value. The system for generating such matrix values will now be described. As explained in the ISO MPEG-2 Document (section 7.4.2.1), the values in any given macroblock will be multiplied by either a default quantization matrix or by a user-defined loaded quantization matrix that may change with each new sequence of pictures considered by the decoder. Note also that matrices are different for intra and non-intra coded macroblocks. As the values of the default quantization matrices are invariant regardless of the data stream input to the video core decoder, the values of those matrices may be permanently provided within the video core hardware.

Such values may be provided in various forms such as storage in a look-up table ROM. In a preferred embodiment, however, a default quantization matrix state machine 214 generates the values of the default quantization matrices as appropriate in view of states dictated by a row/column state machine 216 and values in a collection of control registers 220. It should be understood that control registers 220 represent a subset of the complete collection of video core registers 164 shown in FIG. 2.

If the inverse quantization block 158 determines that a default quantization matrix is to be employed in performing the matrix multiplication, the appropriate value from the default quantization matrix state machine 214 is supplied as an 8-bit value to a first multiplier 202. First multiplier 202 then multiplies the value from default quantization matrix state machine 214 with an appropriate scalar value generated by a quantizer scale generation state machine 201. The value generated by quantizer scale generator state machine 201 depends upon two factors: a q_scale_type (1 bit) obtained from the picture coding extension, and a quantizer_scale_code (5 bits) obtained from the slice header. The video core registers are programmed with these values by the CPU. Based upon these two values (which the video core determines based upon values in control registers 220), a particular scalar value is generated by state machine 201. A table of the scalar values as a function of q_scale_type and quantizer_scale_code is provided as Table 7—6 in the ISO MPEG-2 Document. For QF[0][0], the scalar value generated by state machine 201 is simply 1 so that the output of the first multiplier 202 is the intra_dc_mult value mentioned above.

The scalar value is a 7-bit value supplied to first multiplier 202. The output of the first multiplier is a 15-bit scaled matrix value which is provided to second multiplier 204 on the inverse quantization pipeline. While the quantization scale generator 201 is preferably a state machine it may take other forms such as a look-up table. Preferably the first multiplier 202 is designed to efficiently multiply those scalar values specified in the MPEG-2 Document.

A quantization matrix interface 212 stores the non-default matrix values associated with a current sequence of pictures. These values are provided through interface 187 from the extension associated with the current sequence. There will be one 64 byte matrix for intra coded blocks and a different 64 byte matrix for non-intra coded blocks. The values for each of these matrices are loaded into quantization matrix interface 212 when the bit stream for each new video sequence is received (see steps 110 and 111 of FIG. 1B). Preferably the quantization matrix unit 212 includes RAM and control logic to interface weight matrices for both intra and non-intra coded pictures. Preferably, the RAM is organized as 32 words of 32 bits each, with each word representing four weight values. Each memory has a write port for CPU matrix download and a read port for IQ process needs.

The values from quantization matrix interface 212 are provided as 8-bit values to first multiplier 202, through default matrix state machine 214, at appropriate times for multiplication with scalar values generated by state machine 201 as described above. Collectively, the quantization matrix interface 212 and the default quantization matrix state machine form quantization matrices storage unit 160 referenced in FIG. 2.

To ensure that the correct values from the quantization matrices storage unit 160 are supplied at the appropriate times to multiply with the correct DCT coefficient provided in the inverse quantization pipeline, a row and column state machine 216 provides indicia of the current row and column within the selected matrix. As there are 64 values in each matrix, each value denoted by a row value and a column value, row and column state machine 216 indicates which column and which row of the matrix should be selected to provided the correct value from the matrix at the correct time for the discrete cosine transform coefficient working its way through the inverse quantization pipeline. Row and column state machine 216 changes state depending upon appropriate indicia control register 220 and the current clock cycle. The row and column state machine 216 may specify matrix positions according to one of two MPEG-2 inverse scan matrix formats. As noted, these are described at section 7.3 of the ISO MPEG-2 Document.

Collectively, quantization matrix interface 212, default quantization matrix state machine 214 and row and column state machine 216 generate a "weighting" factor W[w][v][u] as described above. Further, all above-described elements of the inverse quantization unit 158, except the saturation and mismatch control unit 208, execute the single mathematical expression provided for inverse quantization in section 7.4.2.3 of the ISO MPEG-2 Document.

Of particular note in the preferred implementation of the inverse quantization decoder function, are the following features. First, the default quantization matrix is generated by a state machine 214 rather than a ROM or other form of generic storage. Thus, relatively little chip area is employed to store the default matrices. Further, the quantization scale generator 201 is a state machine, as is the row and column generator 216. Each of these state machines is dedicated to specific inverse quantization functions and collectively they reduce the overall number of storage and processing elements that must be included in the inverse quantization unit 158. It should be also noted that first multiplier 202 is preferably optimized for multiplying the particular values that can be generated by state machine 201. Finally, the inverse quantization unit 158 is designed so that no lines are greater than 32-bits in width. This not only conserves power but also facilitates line routing.

2. The Inverse DCT Architecture

Figure 4:
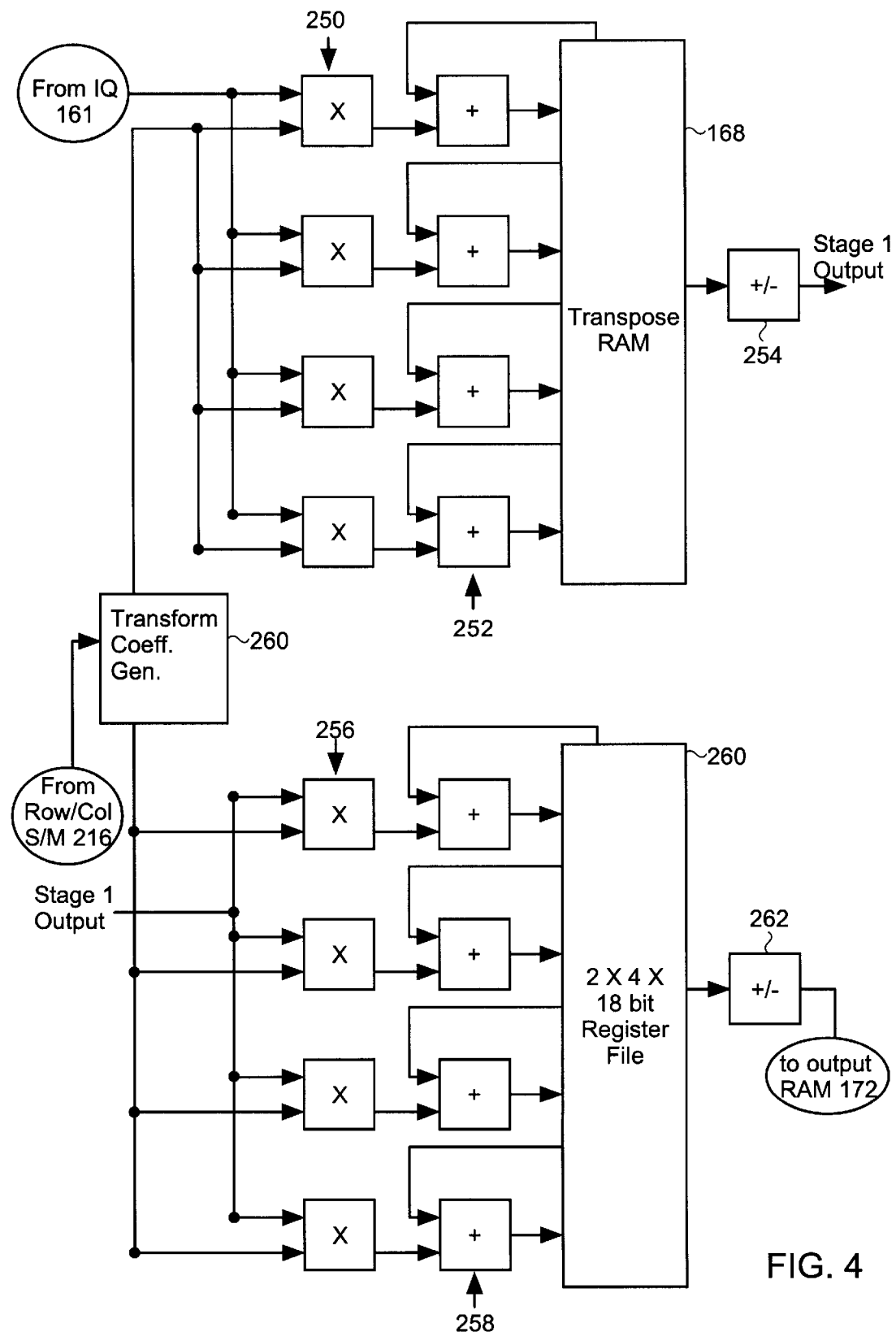
FIG. 4 is a block diagram of the micro-architecture of the hardware elements performing inverse discrete cosine transformation.

FIG. 4 provides a detailed block diagram of the hardware elements comprising blocks 166, 168, and 170 (FIG. 2) in a preferred embodiment of the present invention. Together these blocks convert frequency domain DCT coefficients to time domain pixel values in Cartesian coordinates according to the following inverse discrete cosine transform expression:

$$f(x,y)=\frac{1}{4}[\Sigma\Sigma C(u)C(v)F(u,v) \cos((2x+1)u\pi/16) \cos((2y+1)v\pi/16)]$$

The inner summation is performed over v=0 to v=7. The outer summation is performed over u=0 to u=7. F(u,v) represents the two-dimensional inverse quantized DCT coefficients and f(x,y) represents the pixel values generated by the MPEG-2 decoder. $C(0)=1/\sqrt{2}$ and $C(k)=1$, for k=1, . . . , 7. This expression is required by Annex B of the MPEG-2 document. The IDCT hardware of the present invention implements the above expression.

The above expression for f(x,y) may be separated into two one-dimensional expressions (one for decoding in the x-dimension component and 30 the other for decoding in the y-dimension). For example, the x-dimension expression is given as follows:

$$f(x) = \Sigma F(u)[C(u) \cos((2x+1)u\pi/16)]$$

In this expression, the summation is conducted from u=0 to u=7.

The IDCT_1 unit 166 implements this expression and the IDCT_2 unit 170 implements the corresponding y-dimension expression. To generate the values of f(x) and f(x,y), a matrix of coefficient values of $C(u)\cos((2x+1)u\pi/16)$ must be provided. These values are generated by a transform coefficients generator 260 (FIG. 4) and take the form shown on the next page.

TABLE 1

TRANSFORM COEFFICIENT GENERATOR VALUES

| | | | | | | | |
|---|---|---|---|---|---|---|---|
| 0.707107 | 0.980785 | 0.923880 | 0.831470 | 0.707107 | 0.555570 | 0.382683 | 0.195090 |
| 0.707107 | 0.83147 | 0.382683 | −0.195090 | −0.707107 | −0.980785 | −0.923880 | −0.555570 |
| 0.707107 | 0.555570 | −0.382683 | −0.980785 | −0.707107 | 0.195090 | 0.923880 | 0.831470 |
| 0.707107 | 0.195090 | −0.923880 | −0.555570 | 0.707107 | 0.831470 | −0.382683 | −0.980785 |
| 0.707107 | −0.195090 | −0.923880 | 0.555570 | 0.707107 | −0.831470 | −0.382683 | 0.980785 |
| 0.707107 | −0.555570 | −0.382683 | 0.980785 | −0.707107 | −0.195090 | 0.923880 | −0.831470 |
| 0.707107 | −0.831470 | 0.382683 | 0.195090 | −0.707107 | 0.980785 | −0.923880 | 0.555570 |
| 0.707107 | −0.980785 | 0.923880 | −0.831470 | 0.707107 | −0.555570 | 0.382683 | −0.195090 |

In Table 1, the value of u varies from 0 to 7 horizontally from left to right and the value of x varies from 0 to 7 vertically from top to bottom.

A first array of four multipliers 250 of FIG. 4 performs the multiplication operations required in the first stage of the inverse discrete cosine transformation (i.e., the one-dimensional transform to produce f(x)). Specifically, array of multipliers 250 multiplies each incoming DCT coefficient from IQ unit 161 with four of the constant matrix coefficients (Table 1) generated by a transform coefficients generator 260. The appropriate matrix coefficients are determined based upon row/column information provided from row/column state machine 216. Transform coefficients generator 260 is preferably itself a state machine having as many states as there are unique discrete coefficients in the matrix.

First multiplier array 250 multiplies a single DCT coefficient with four matrix coefficients in a single cycle. Because both the DCT and the coefficient matrix are 8 by 8 matrices, it might be expected that matrix multiplication would require that each DCT coefficient be multiplied by eight coefficients. However, only half the multiplication steps are required because of symmetry in the coefficient matrix. As can be seen from inspection of the values in Table 1, each value is has a complement that varies by at most a sign change. Thus, additional multiplication steps beyond four per DCT coefficient would be redundant.

As explained above, the DCT coefficients are provided in an inverse scan order that in one embodiment takes on zig-zag format. Thus, the DCT coefficients do not arrive at multipliers 250 in convenient row/column order. As such, the outputs of the multipliers (partial sums) must be stored in transpose RAM 168 (which is capable of storing 64 18 bit values) until in the entire block of 64 DCT coefficients is provided. For example, to generate the first value of an output matrix for the one-dimensional inverse discrete cosine transform, for example, all eight values of the first row of the DCT matrix must be multiplied by corresponding column values from the first column of the constant coefficient matrix. The eight resulting products are then summed to obtain the first value of the output matrix. Unfortunately, the eight DCT values in the first row of the DCT matrix will not arrive in sequence. Thus, the products of multiplying the DCT values by four values from the transform coefficient generator 260 are stored in transpose RAM 168.

As additional DCT values are provided and multiplied by coefficients from generator 260, those values are summed with stored values from transpose RAM 168 by four two's complement accumulators 252. The resulting sums are then written back to the appropriate locations in RAM 168. Ultimately, after all 64 DCT values have been received, multiplied, and summed as dictated by the one-dimensional inverse discreet cosine transform matrix multiplication expression, 64 values are stored in transpose RAM 168.

These values are not the values of an output matrix, however, because each incoming DCT value was multiplied by only four rather than eight coefficient values. Thus, the values stored in RAM 168 must be added to or subtracted from one another to generate the f(x) values of the output matrix. An adder/subtractor unit 254 adds or subtracts the values stored in RAM 168 to generate the desired f(x) output values.

The output f(x) values from unit 254 are provided to the second stage of the inverse discreet cosine transform unit (IDCT_2 170 of FIG. 2). As shown, IDCT_2 170 includes a bank of four multipliers 256, a bank of four two's complement accumulators 258, 2×4 18 bit register files, and an adder/subtractor 262.

Values are retrieved from RAM 168 in an order that facilitates direct matrix multiplication in IDCT_2 170. Specifically, all values in the first row of the IDCT_1 output matrix are retrieved in sequence to generate the desired value of the IDCT_2 output matrix. Hence, less storage is required for temporary values and the 8 18 bit registers are adequate for all storage requirements of the second stage inverse discreet cosine transform.

The output f(x) values from 254 are initially provided to the array of four multipliers 256 where they are multiplied by appropriate coefficients generated by transform coefficient generator 260. Note again that the symmetry in the coefficient matrix requires only four, rather than eight, multiplication steps for each input value. As subsequent f(x) values are supplied from unit 254, they are multiplied at multipliers 256 and then subsequently added to previously stored partial sums from values in their same rows taken from registers 260. The addition is performed by accumulators 258. After all values from a given row of f(x) have been appropriately multiplied and added, the values in registers 260 are added to or subtracted from one another at unit 262. This provides the final pixel values. These values are then written to RAM 172 (FIG. 2) where they are stored until the appropriate time for transfer to merge and store unit 174. Output RAM 172 is preferably a two port memory (one write port and one read port) sized to store 16 words of 64 bits each. Thus, RAM 172 holds up to two complete blocks.

3. The Motion Compensation Unit

When a macroblock is B or P coded, that macroblock will have an associated motion vector. In the case of a P coded macroblock, the motion vector will point to a corresponding macroblock in a previous (in time) frame. In the case of a B coded macroblock, there will be two motion vectors, one pointing to a corresponding macroblock in a previous frame (a backward vector) and one pointing to a corresponding macroblock in a later (in time) frame. A B type macroblock is reconstructed as an average of the two macroblocks (taken from previous and later frames) that it references. Each motion vector has associated therewith a direction and magnitude which specifies where in the previous (or later) frame to find the corresponding macroblock to be used in motion compensation. Each motion vector also includes parameters specifying whether any "half pel averaging" must be performed, and if so, the type of half pel averaging that must be performed.

Among other factors, the type of half pel averaging employed may apply to either fields or frames. Each frame includes the full complement of pixels in an MPEG-2 picture. As noted, such frames are displayed at a rate of 30 Hz. A field, in contrast, includes only half of the rows of pixels appearing in a full frame. Two fields together comprise a frame. One of these frames includes odd pixel rows and the other includes even pixel rows. In implementation, fields are displayed at a rate of 60 Hz so that frames are effectively displayed at 30 Hz. The relevance of this field versus frame distinction will become apparent below.

Half pel compensation (sometimes referred to herein as half pel averaging) is employed in MPEG-2 decoding to improve image quality. It should be understood that half pel averaging is not necessarily employed for all motion compensation. As noted, information contained with the motion vector will indicate whether or not half pel averaging is actually performed. From the standpoint of the video core, the information pertaining to half pel averaging is obtained from appropriate locations within the core's registers. Such information is loaded to the registers after the macroblock header is decoded.

Figure 5A:
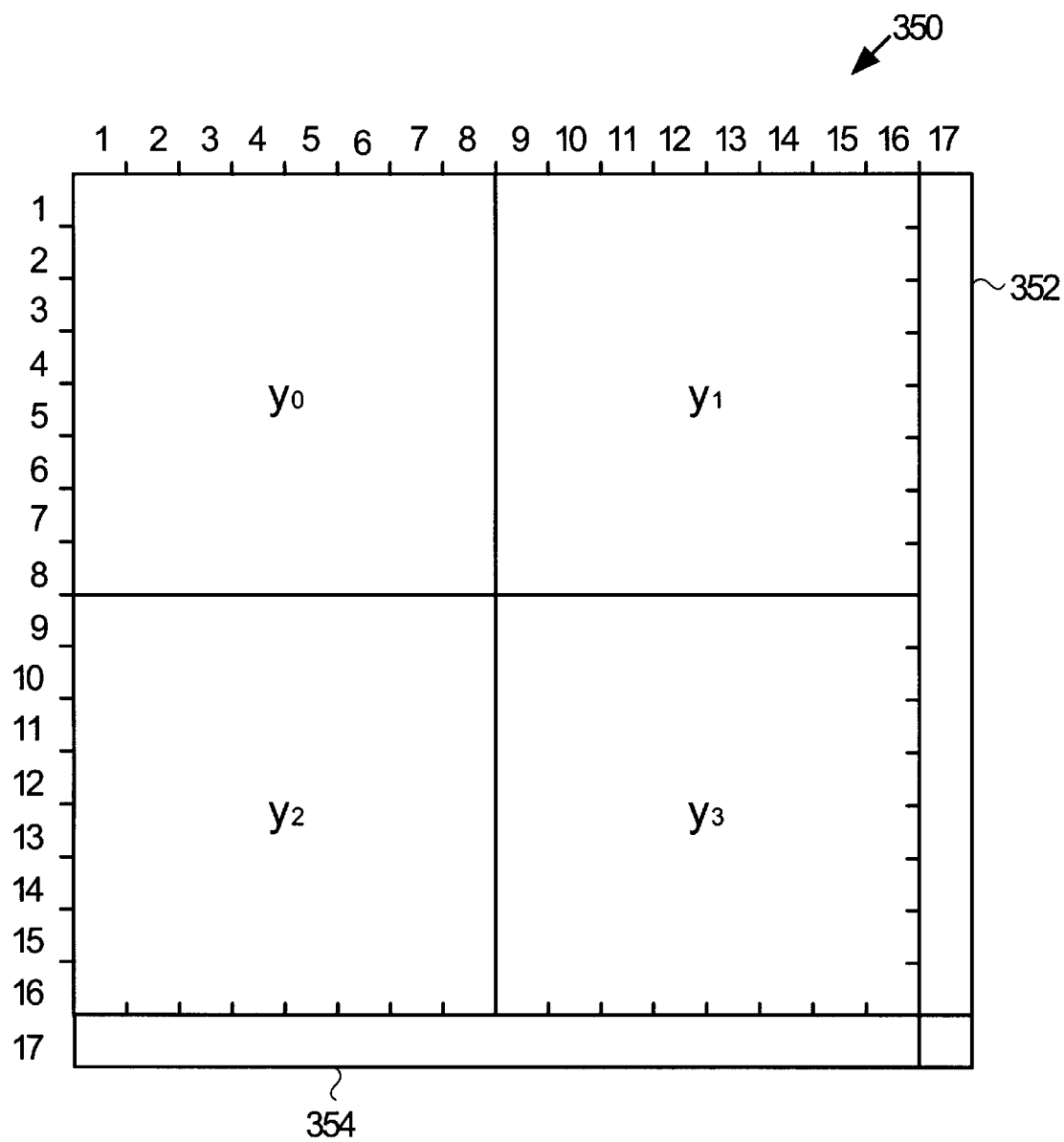
FIG. 5A is a diagram of a 17-by-17 pel block used for motion compensation.
Figure 5B:
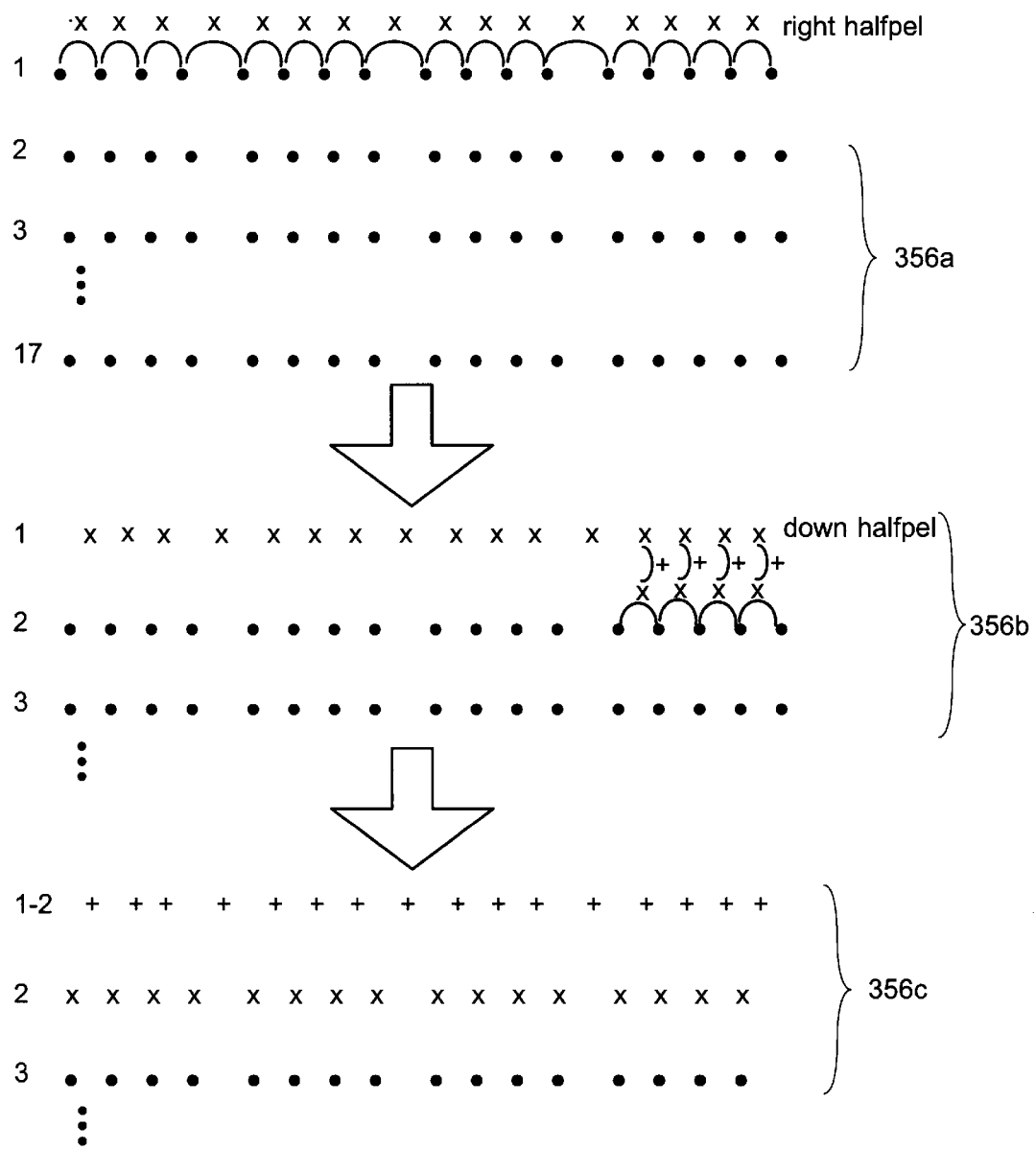
FIG. 5B is a diagram showing the mechanisms of right half pel averaging and down half pel averaging.

Half pel compensation can be understood generally with reference to FIGS. 5A and 5B. FIG. 5A shows a macroblock 350 that has been referenced by a motion vector. In other words, a motion vector associated with a macroblock currently being decoded will point to corresponding macroblock 350 in a previous or subsequent frame. The decoded pixels provided in macroblock 350 are then retrieved for further processing, including possibly half pel averaging, during reconstruction of a current macroblock. As shown, macroblock 350 includes a base structure of 16×16 pixels. That structure is in turn divided into four luminance blocks: y0, y1, y2, and y3. Each of these luminance block contains 64 (8×8) luminance pixel values. Each such luminance value is 1 byte in length. The basic 16×16 macroblock also includes one 8×8 block of chroma red and one 8×8 block of chroma blue. The chrominance values for the chroma red and chroma blue blocks are evenly dispersed over macroblock 350. Thus, one chroma red value is provided for every four luminance values and one chroma blue value is provided for every four luminance values.

Now while a macroblock is defined unambiguously as containing 16×16 pixels of information, for purposes of half pel averaging, one additional row and/or one additional column of pixel data may be retrieved during the decoding of a current B or P macroblock. Thus, as shown in FIG. 5A, a seventeenth column 352 may be retrieved. Likewise, a seventeenth row 354 may also be retrieved—by itself or together with column 352. The seventeenth row or column may include either luminance values, chrominance values, or both. Remember of course that the macroblock is processed one block at a time.

Turning now to FIG. 5B, the mechanisms of half pel compensation are depicted. For purposes of this example, it will be assumed that both a seventeenth column and a seventeenth row have been included in the macroblock retrieved with the motion vector.

As shown, the retrieved values 356a are provided as a block of 17×17 values. The purpose of half pel averaging is to reduce this 17×17 block to the conventional 16×16 format for a macroblock. This accomplished by a simple averaging scheme.

The process of removing the seventeenth column is referred to as right half pel compensation. The process of removing the seventeenth row is referred to as down half pel averaging. Turning first to the case of right half pel averaging, the value provided in the right-most top position of block 356a is averaged with the value at the position immediately to its left. This is depicted as a combination of two dots (values) to produce a resulting average value shown as an x. The averaging employed here is a simple arithmetic average. This process is continued for each pair of adjacent values in the top row to produce sixteen average values (shown as x's) when the process is complete. Thus, one column of the seventeen original columns has been eliminated. If only right half pel compensation is to be performed, the process depicted for the top row of block 356a is repeated for each of the sixteen rows in the retrieved macroblock. When this process is complete, resulting macroblock values are simply used in the currently reconstructed picture.

When it becomes necessary to perform down half pel averaging, adjacent values in each column must be averaged to eliminate the extra row of retrieved values. Assuming for the moment that both right half pel averaging and down half pel averaging must be performed, the process is depicted in blocks 356a, 356b, and 356c of FIG. 5B. As shown in block 356a, a top row of seventeen values (dots) are converted to a row of sixteen resultant values (x's). When the second row of original values is averaged (starting right and moving left as described with respect to the first row), the resulting values in the second row are averaged with the corresponding adjacent values in the first row to produce a new resulting value indicated by plus signs in block 356b. As this process proceeds, the first and second rows are combined to form a single resulting row of sixteen values.

When the combination of the first and second rows is complete, a right half pel averaging procedure begins on the third row as shown in block 356c. This process will be performed exactly as described above with respect to the first and second row. The resulting average values will themselves be averaged with the corresponding values from the second row.

The process continues in this manner until all values in the seventeen rows and columns have been averaged. When this process is complete, the 17×17 block of retrieved pixel values will have been converted to a 16×16 standard macroblock which may be employed to reconstruct the current picture.

It should be understood that when only down half pel averaging is performed, the steps of combining adjacent values in the rows is not performed. The down half pel compensation process simply combines adjacent values in columns to eliminate one of the rows.

While the examples illustrated in FIGS. 5A and 5B show a 17×17 block of retrieved data, other possibilities exist. As indicated, a 16×17 (sixteen rows and seventeen columns) block may be retrieved if only right half pel averaging is being performed. Similarly, a block of 17×16 would be retrieved if only down half pel compensation is to be performed. When a block of chrominance values is retrieved, the block may take the form of 8×9, 9×8, or 9×9 (for both right half pel and down half pel averaging). Further, if the values are being retrieved to reconstruct a field (as opposed to a frame), only half the number of rows of a normal block or macroblock need be retrieved. Thus, the values retrieved may also take the form of 9×16, 8×17, 9×17, 5×8, 4×9, and 5×9 blocks. As explained in the ISO MPEG-2 document, special forms of motion compensation (such as "16×8" and "dual prime" motion compensation) may be performed. The differences in treatment of these different types of motion compensation are only pertinent in steps performed outside of the video core. From the video core's perspective, it need only know the form of the data it is receiving (17×17, 5×8, etc.). It will know the form of that data by values stored in appropriate video core registers.

As noted, when the motion vector is decoded it will specify certain information. Among that information is the form of the block that is being retrieved from another frame. That information is provided to the video core registers so that a motion compensation unit in the video core can perform the appropriate half pel averaging. More specifically, a video core register denoted as the Macroblock Control Register Set contains information as to whether a forward or backward vector is employed, chrominance or luminance data is employed, a first field or second field is employed, and whether the data should be employed for frame or field reconstruction. For each possible combination of these parameters, the register values specify whether there is no half pel compensation, right half pel compensation is required, down half pel compensation is required, or right and down half pel compensation is required.

To perform half pel averaging, the half pel compensation unit 176 of FIG. 2 receives a block of pixel values from an appropriate reference picture stored in one of storage areas, 181, 182, 183, etc. It pulls that collection of values from a position in the reference picture determined by the current motion vector. Pixel values from the appropriate portion of the reference picture (in the form of chrominance or luminance values) are provided to the video core as motion reference data 177, 4 bytes at a time, or 5 bytes at a time (in the case of right half pel compensation or right/down compensation).

Figure 5C:
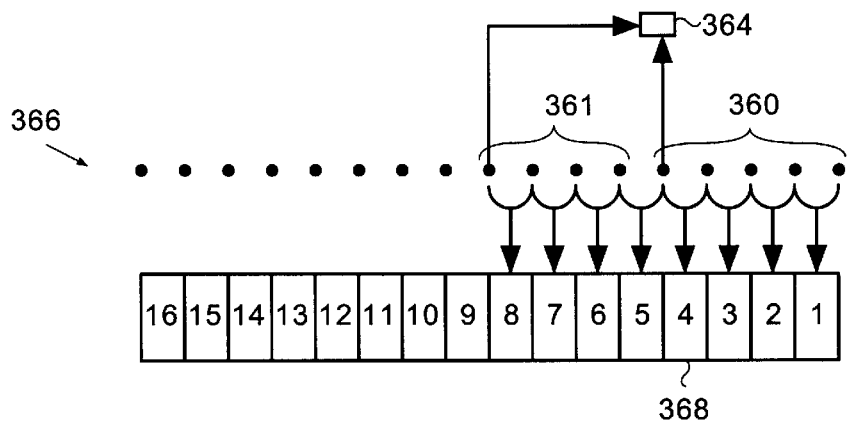
FIG. 5C is a block diagram showing a line buffer employed to store right half pel averaging values.
Figure 5E:
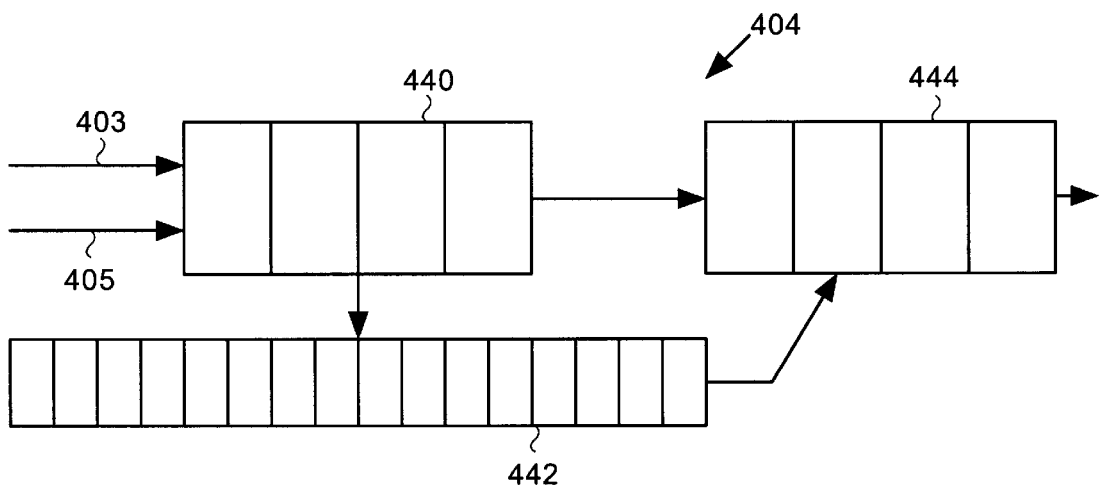
FIG. 5E is a block diagram of the architecture of a half pel compensation unit in accordance with a preferred embodiment of the present invention.
Figure 5D:
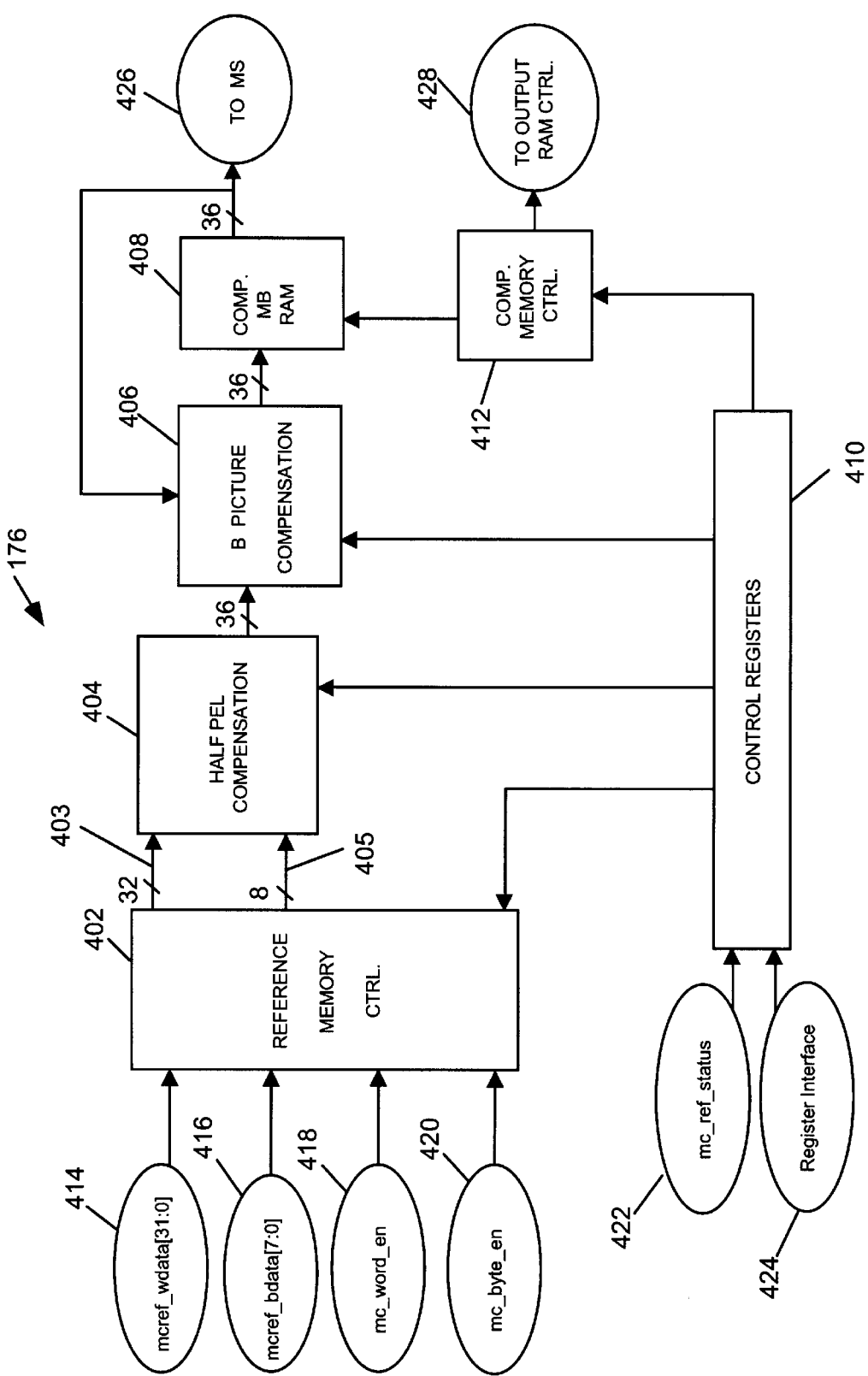
FIG. 5D is a block diagram showing the hardware elements of a motion compensation unit in a video decoder core in accordance with a preferred embodiment of this invention.

Referring briefly to FIG. 5D, one preferred microarchitecture of motion compensation unit 176 is shown. This architecture will be described in more detail below. However, at this point, it should be noted that the input data is provided in two lines. A first 32-bit data path 403 inputs four values for a current row being averaged. A second 8-bit data path 405 is reserved for those right half pel compensation cases when the incoming block has rows of five, nine, or seventeen pels.

A preferred algorithm by which the motion compensation block of the present invention performs half pel averaging will now be described with reference to FIG. 5C. For right/down half pel averaging, the motion compensation unit 176 initially takes in the five right-most values 360 of the top row 366 of retrieved data. First, the two right-most values are averaged to provide a 1 byte average value which is stored in a first location of a sixteen byte line buffer 368. Next, the second and third right-most values are averaged and the results are stored in a second location of line buffer 368. Thereafter, the third and fourth values are average and stored at a third location in buffer 368. Thereafter, the fourth and fifth values are averaged and the result is stored in a fourth location in buffer 368. In addition, the value of the fifth data byte from the collection of five bytes 360 is stored in a single byte storage unit 364.

Next, the data values 361 in the sixth through the ninth positions of the first row 366 are brought in for processing by motion compensation unit 176. Initially, the value stored in storage unit 364 (i.e., the value of the fifth position in original row 366) is averaged with the value in the sixth position of row 366. The resulting value is written to the fifth location in line buffer 368. Next, the values in the sixth and seventh position of rows 366 are averaged and written to the sixth position of line buffer 368. Next, the values in the seventh and eighth positions of rows 366 are averaged and written to the seventh location of line buffer 368. Thereafter, the values in the eighth and ninth positions of row 366 are averaged and written to the eighth position of line buffer 368. Finally, the current value in ninth position is written to the single byte storage unit 364.

This procedure continues as described, with four row values being processed at one time, until each pair of two adjacent values in line 366 have been averaged and ultimately written to line buffer 368. Note that for each group of values processed, it is necessary to temporarily store in location 364 the left most value. Thus, a given value need not be input twice in order to ensure that it is averaged with its neighbors on both sides.

The above process has the advantage of only requiring four cycles to process sixteen or seventeen values in a row. Likewise, it can process eight or nine value rows in only two cycles. It accomplishes this by having an architecture (described below) which allows it to handle either four or five pixel values in a single cycle. Thus, a separate cycle need not be allocated to process the "odd" value required for right half pel compensation.

In addition, by processing the values by right to left (as opposed to left to right), the process may be performed with smaller input data paths. This can be understood as follows. Five values are required to generate four right half pel average values. However, the input pel values are stored in blocks of four starting at the left side. Only the right-most pel in a line is stored separately from one of these blocks. Thus, if the half pel averaging was to take place from left to right, two groups of four values each would have to be read in for generating the first four average values. The hardware needed for this processing would have to be able to input two blocks of four (or eight) values in a single cycle. By proceeding right to left, only five pel values (one group of four and the rightmost "odd" value) need be read in at any given cycle. Hence, the hardware for right to left processing need only input one block of four and single odd value in a cycle.

After the first row has been half pel averaged and loaded in buffer 368 as described above, the next row of values below 366 are processed as follows. The first two right-most values in a second row are right half pel averaged as before and the resulting value is averaged with the corresponding value in the first position of line buffer 368. The resulting down half pel value is then written to storage RAM outside of the half pel averaging unit. Then, the right half pel value of the second line is written to the first location in line buffer 368. Next, the second and third rightmost pixel values of the second row are right half pel averaged as above, and the result is averaged with the value in position two of line buffer 368. The resulting down half pel value is written to RAM at an appropriate location, and the second right half pel value is written to position two in line buffer 368. Thereafter, the third and fourth values of the second row are right half pel averaged and down half pel averaged as described above. This process of right and down averaging is repeated, pixel by pixel, toward the left value of the second row.

This process is repeated row-by-row until the sixteenth and seventeenth averaged. At that point, a complete macroblock of 16×16 values is stored in RAM.

Note that line buffer 368 serves as a temporary storage unit only when down (or right/down) half pel is employed. If only right half pel averaging is performed (without down half pel averaging), the averaged values will not be stored in line buffer 368, but will be immediately forwarded to the next processing or storage block.

The above procedure for performing right half pel compensation and down half pel compensation apply for any given motion vector. For a P type picture, reconstruction of the current macroblock is complete after one retrieved block of data has been half pel averaged and stored as appropriate. However, with a B type picture, the above procedure needs to be performed twice (Once for the forward motion vector and once for the backward motion vector.) The resulting forward and backward references then must be averaged with one another to generate the final macroblocks values for the picture currently under consideration. The process for a B type macroblock may be summarized as follows. First, the values from the forward motion vector are retrieved and half pel compensation is performed as necessary. The resulting average values are stored in RAM as described above. Thereafter, motion compensation unit 176 begins receiving values specified by the backward motion vector. Those values are treated as follows. For each four values generated (after right half pel and down half pel averaging as appropriate), these values are averaged with the corresponding values for the forward reference data stored in RAM. The resulting average values then overwrite the corresponding forward reference values in RAM. This process is continued with successive blocks of four values (after appropriate half pel compensation) from the backward reference data. Note that to store the full compliment of 16×16 macroblocks values, the RAM should be large enough to accommodate 16×16 bytes. Therefore the RAM is preferably two banks of 32 by 36 bits each.

As noted, FIG. 5D is a block diagram of a motion compensation unit 176 for performing the half pel averaging process as described above. Motion compensation unit 176 includes a motion compensation pipeline which includes a reference memory controller 402 which receives input pixel values, a half pel compensation block 404, a B-picture compensation unit 406, and a compensation macroblock RAM 408. Motion compensated pixel values stored in RAM 408 are periodically provided to merge and store unit 174 through an interface 426.

The inputs to reference memory controller 402 include a group of four pixel values of one byte each provided on data path 414 (mcref_wdata[31:0]). This data includes four bytes, one byte for each of four adjacent locations on a row of luminance or chrominance values. Other data to reference memory controller 402 is provided to as a one byte value which will be provided only when right half pel averaging is being performed and only when the right-most group of five values are to be half pel average. In other words, this data path is reserved for the right-most pixel value in data that is to be right half pel average. This single byte of data is provided on data path 416 (mcref_bdata[7:0]). Other inputs to reference memory controller 402 include a one bit signal 418 (mc_word_en) which, when set high, indicates that motion compensation data is on line 414. Finally, a one bit input signal 420 (mc_byte_en) indicates, when set high, that valid data is on line 416.

The reference memory controller 402 includes the necessary handshaking logic to take in data. It also includes logic for determining if right half pel compensation is necessary and routing the appropriate values over 32-bit line 403 and 8-bit line 405. Normally, groups of four adjacent pixel values are routed over line 403. However, when right half pel averaging is to be performed and the right-most collection of 5 input bytes is to be processed, the right-most pixel value is sent over line 405. Reference memory controller 402 will know when to expect right half pel compensation values based upon information from the appropriate decoded motion vector, which information is stored in a control register within a group of control registers 410. If no half pel compensation is necessary, reference memory controller 402 simply directs the input pixel values to be stored in compensation macrobyte RAM 408, without processing in either half pel compensation unit 404 or B-picture compensation unit 406.

The half pel compensation unit 404 includes the logic and storage necessary to perform actual half pel compensation calculations. Details of the structure are provided in FIG. 5E. As shown there, pixel values from lines 403 and 405 are provided to a first group of four adders 440. Each of the four adders in 440 performs one right half pel averaging step. The results are stored, in groups of four values, at the appropriate locations in a sixteen byte line buffer 442. Down half pel averaging is performed as follows. Initially, current pixel values for a line are stored in line buffer 442. Thereafter, as a lower row of pixel values is provided to compensation unit 404, those values (either uncompensated or first subjected to right half pel compensation) are added to the corresponding values from line buffer 442 in a bank of four adders 444. The resulting inter-row averaged values are provided from adders 444 to B-picture compensation unit 406 or compensation macroblock Ram 408 as appropriate. Thus, it can be seen that half pel compensation unit 404 follows the procedure prescribed with reference to FIG. 5C.

If the macroblock being processed is a B-type macroblock, then the forward and backward motion references must be averaged, as noted above. Initially, the forward motion reference is subjected to half pel averaging, as necessary, and temporarily stored in compensation macroblock RAM 408. As the corresponding backward motion reference is processed, data from half pel compensation unit 404 is provided to B picture compensation unit 406, four pixel values at a time. Those four values are then averaged with the corresponding four values from the forward referenced values stored in RAM 408. Thus, B picture compensation unit 406 has two inputs: a 36-bit input from half pel compensation unit 404 and a 36-bit input line from compensation macrobyte RAM 408. Unit 406 itself consists of four adders and a shifter to perform the averaging operation. The values resulting from averaging the forward and backward references in B picture compensation unit 406 are then written to the appropriate locations in RAM 408. This, in effect, overwrites the values for the forward motion reference that had been previously stored at 408. This averaging and overwriting procedure is performed four pixel values at a time until the macroblock RAM 408 stores a complete macroblock of B average values. The resulting average macroblock values are then provided to merge and store unit 174 through interface 426.

Compensation macroblock RAM 408 is preferably organized as two banks of 32×36 bit memories each having one read and one write port. Hence, RAM 408 is capable of storing a 16×16 macroblock (256 bytes). Thus, RAM 408 holds one complete macroblock of any picture type and may also be used to store intermediate compensated pictures (for B pictures). Its input and output lines are both thirty two bits. Thus, four pixel values can be written to or read from RAM 408 in any given clock cycle.

Control register 410 provides the information to allow the motion compensation unit 176 to perform the appropriate operations depending upon the current clock cycle. From such information it is known which four or five pixel values are being input to controller 402. It also provides the system with knowledge of whether forward or backward motion references are employed. Further, it provides information to whether a first or second vector (associated with two different fields) are being processed. Output 422 (mc_ref_status) from control registers 410 indicates whether the motion compensation pipeline is active and the status of the compensation macroblock RAM 408. This information is important, as no additional input data can be provided to controller 402 until RAM 408 is available for fresh pixel values. A register interface 424 is provided between the control registers 410 and the larger bank of registers 164 shown in FIG. 2.

Finally, a compensation memory controller 412 controls the addressing to compensation macroblock RAM 408. Specifically, the current values in control register 410 let compensation memory controller 412 know where data is to be written to or read from RAM 408. An interface 428 to a merge and store RAM controller provides information to merge and store unit 174 for the purpose of synchronizing the merge operation between motion compensated blocks from interface 426 and error blocks from the IDCT unit.

The above architecture has the advantage of employing a word path 403 and a byte path 405 allowing a high throughput. In a preferred embodiment, motion compensation is in unit 176 is performed in sixteen cycles per block (of pixel values) when right half pel compensation is required. When both forward and backward compensation is required, the throughput is 32 cycles per block.

4. The Merge and Store Unit

Figure 6:
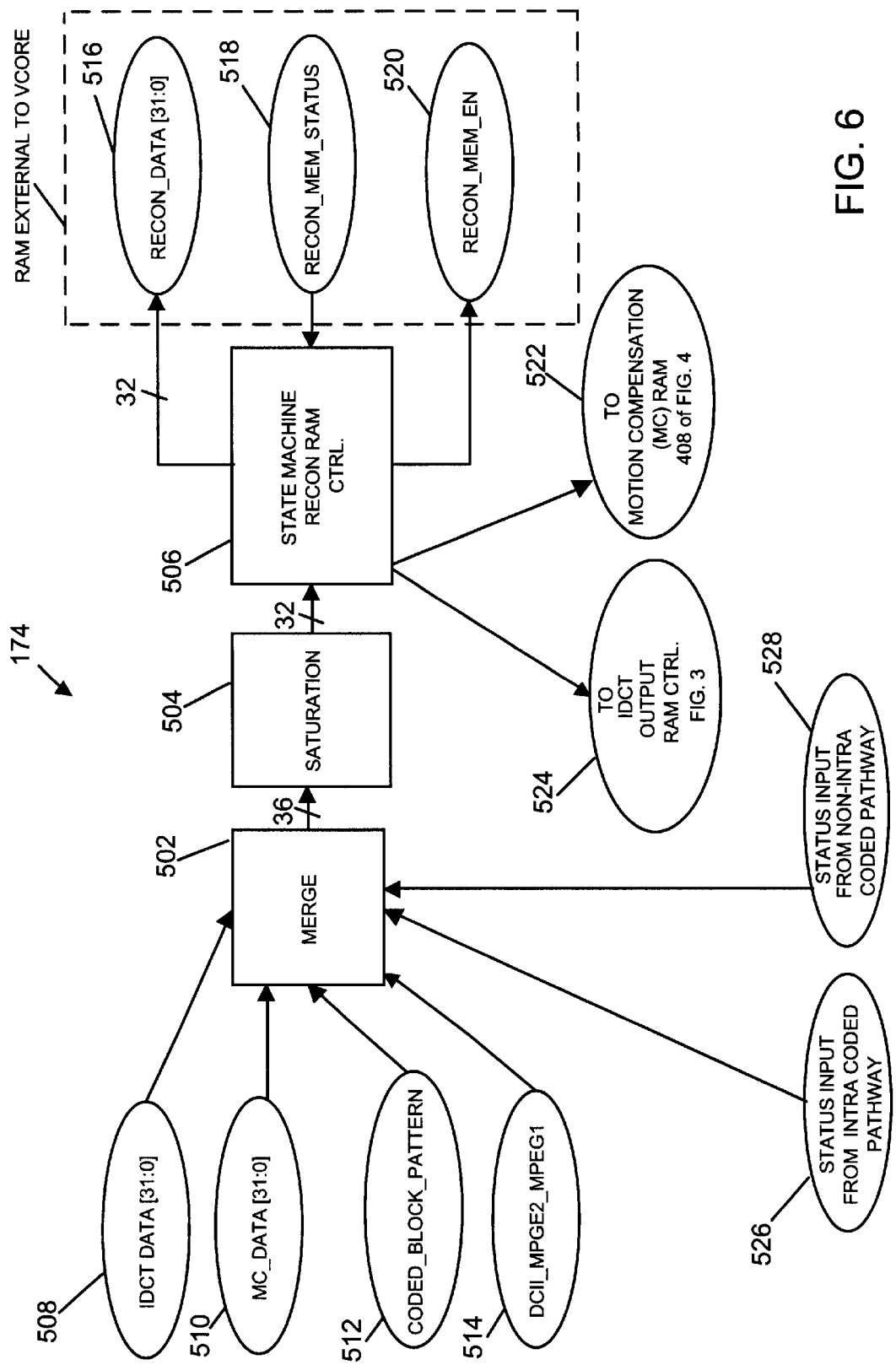
FIG. 6 is a block diagram showing the hardware elements of a inverse merge and store unit in a video decoder core in accordance with a preferred embodiment of this invention.

FIG. 6 is a detailed illustration of merge and store unit 174 of FIG. 2. In general, the microarchitecture associated with merge and store unit 174 includes a merge block 502, a saturation block 504 and a reconstruction RAM controller block 506. The output reconstruction RAM is not itself part of the video core. In one embodiment, merge block 502 consists of logic elements capable of performing binary addition. By way of example, the logic elements may include four adders capable of adding positive and negative macroblock data values being received from the intra coded pathway and motion compensation pathway as discussed above.

The function of saturation block 504 is to receive the merged macroblock data information from block 502 and reduce the data bit stream by dropping the least significant bit (to clip the pixel value to 8 bits). Often, merge block 502 will not be required to perform a merge operation and therefore the macroblock data leaving merge block 502 will not be wider than 32 bits. If this is the case, saturation block 504 will not drop the least significant bit and a 32 bit wide bit stream will pass into reconstruction RAM controller block 506. Reconstruction RAM controller block 506 is a state machine which is designed to receive the macroblock data bit stream from saturation block 504 and transmit the reconstructed macroblock data to a RAM that is external to the VCORE.

In one embodiment, a data type block 514 indicator and a coded_block_pattern (CBP) 512 are parameters available to merge block 502. In general, data type block 514 is used to identify what type of encoding process was used on the data bit stream entering merge block 502. In this embodiment, the decoder is able to distinguish between DigicipherII, MPEG-1 and MPEG-2 algorithms used to encode the macroblock data bit stream. As described above, CBP 512 is configured to inform merge block 502 of whether specific blocks within the current macroblock have an error component which must be passed down the intra coded pathway.

Further, there are two data paths entering merge block 502. The first data path is an IDCT data path 508 (i.e., data coming down the intra coded pathway) and the second data path is a motion compensation (MC) data path 510 (i.e., data coming down the non-intra coded pathway). As described above, if the current macroblock is an intra coded macroblock, all six blocks that make up the current macroblock will enter through path 508 and pass through merge block 502 and no addition operation will be performed. On the other hand, when the current macroblock is non-intra coded, some error components may be passing down the intra coded pathway which will ultimately be added with blocks passing down the non-intra coded pathway. This adding is performed by merge unit 502.

Merge block 502 is also shown receiving a status input 526 from the intra coded pathway and a status input 528 from the non-intra coded pathway. By way of example, status inputs 526 and 528 may be configured to provide merge block 502 with information regarding the availability of each of the intra coded and non-intra coded pathways. In this manner, merge block 502 is able to determine whether a new macroblock is currently being processed in the macroblock processing logic or VCORE of FIG. 1C.

Attention is now drawn to the data and signal interaction between reconstruction RAM controller block 506 and a RAM device that is external to the VCORE of the present invention. Once the macroblock information for the current macroblock has been reconstructed, reconstruction RAM controller block 506 will provide a "handshake" for transmitting the reconstructed macroblock data to (i.e., recon_data [31:0]) line 516. In addition, block 506 will receive a signal from a status line 518 (i.e., recon_mem_status) which indicates the availability of the external RAM. A recon_mem_en signal 520 is a handshake signal for the external logic to accept data recon_data 516.

Reconstruction RAM controller block 506 also sends a first signal 524 to an IDCT controller used control output RAM 172 (of FIG. 2) and a second signal 522 to motion compensation RAM 408 of FIG. 5D. In one embodiment, these two signals are designed to inform respective memory locations on the VCORE that the data bit stream for the current macroblock is complete.

In operation, macroblock data may be entering merge block 502 from IDCT data path 508 and motion compensation (MC) data path 510. On the other hand, if the current macroblock is intra coded, only intra coded macroblock data will be entering merge block 502 from IDCT data path 508. At this stage, merge block 502 has now received a signal from data type block 514 identifying the current macroblock data as either encoded Digicipher II, MPEG-1 or MPEG-2.

For simplicity, the following discussion will assume the macroblock data being decoded was encoded according to the MPEG-2 standard.

In one embodiment, macroblock data entering merge block 502 via IDCT data path 508 as well as macroblock data entering via MC data path 510 are 32 bits wide. As indicated above, each clock cycle handles four pixel values and each pixel value is defined by 8 bits of data (luminance or chrominance intensity).

If CBP signal 512 indicates that the current block data contains an error component, data will be provided to merge unit 502 through both IDCT data path 508 and MC data path 510. The adders associated with merge block 502 may then produce a bit stream that is 36 bits wide. The data will then be transmitted to saturation block 504 where the least significant bit will be discarded to produce a 32 bit wide reconstructed data output. If the current block contains no error component, it will be passed by merge block 502 and saturation block 504 to reconstruction RAM controller block 506.

The reconstruction RAM controller block 506 will then provide the handshake and write the reconstructed macroblock data onto the external RAM of block 516 (i.e., recon_data [31:0]). In this embodiment, the blocks of the next macroblock will not be reconstructed and merged until the current macroblock has been written onto the external RAM. Once status block 518 informs reconstruction RAM controller block 506 of the availability of external RAM, the next macroblock will then be decoded. By way of example, when the reconstructed macroblock data has been successfully written onto the external RAM, reconstruction RAM controller block 506 will transmit a complete signal 524 to the IDCT output RAM controller (of FIG. 4) and a complete signal 522 to motion compensation RAM 408 of FIG. 5. In this manner, the current macroblock data has now been merged and stored onto the external RAM and the next macroblock data in the video bit stream may be processed by merge and store unit 174 of FIG. 2.

D. Conclusion

Although the foregoing invention has been described in some detail for purposes of clarity of understanding, it will be apparent that certain changes and modifications may be practiced within the scope of the appended claims. For example, while the video decoder core of this invention preferably implements specific functions in accordance the MPEG-2 standard, there is in principle no reason why the video cores of this invention can not be employed with other video decoder algorithms which do not necessarily adhere to the MPEG-2 protocol. Therefore, the present embodiments are to be considered as illustrative and not restrictive, and the invention is not to be limited to the details given herein, but may be modified within the scope of the appended claims.

What is claimed is:

1. A video decoder core design comprising a layout for hardware which performs at least some MPEG-2 video decoding functions, said video core being used on a first integrated circuit having a first integrated circuit design and a second integrated circuit having a second integrated circuit design, wherein the first and second integrated circuit designs have at least some features not in common; and wherein the MPEG-2 functions performed by the hardware are only inverse scan, inverse quantization, inverse discrete cosine transform, half pel compensation, and merge.

2. The video decoder core design of claim 1, further comprising an inverse quantization unit which performs at least the inverse quantization function, wherein the inverse quantization unit includes an input path for receiving encoded discrete cosine transform coefficients from a sequence of encoded video data; and an output path for outputting decoded discrete cosine transform coefficients.

3. The video decoder core design of claim 2, further comprising a quantization matrices unit which provides quantization matrices for use by the inverse quantization unit for performing the inverse quantization function, wherein the quantization matrices unit includes an interface for receiving quantization matrix values from the sequence of encoded video data.

4. The video decoder core design of claim 3, wherein inverse quantization unit performs an inverse scan function.

5. The video decoder core design of claim 1, further comprising a plurality of registers which temporarily store values received from a sequence of compressed video data, the values including at least coded block pattern values and half pel compensation values.

6. The video decoder core design of claim 1, further comprising an inverse discrete cosine transform unit which performs an inverse discrete cosine transformation on discrete cosine transform coefficients, and wherein the inverse discrete cosine transform unit includes an interface for receiving discrete cosine transform coefficients from a source within the video decoder core design.

7. The video decoder core design of claim 6, wherein the inverse discrete cosine transform unit implements Chen's algorithm.

8. The video decoder core design of claim 1, further comprising a half pel compensation unit which includes (i) logic and memory for processing four pixel values simultaneously, and (ii) logic and memory for processing a single odd pixel value simultaneously with four other pixel values to perform right half pel averaging.

9. The video decoder core design of claim 8, wherein the half pel compensation unit processes rows of pixel data from right to left during right half pel averaging.

10. The video decoder core design of claim 1, further comprising a merge and store unit which merges error correction blocks passing through an inverse discrete cosine transform unit with motion compensation blocks passing through a half pel compensation unit.

11. The video decoder core design of claim 10, wherein the merge and store unit passes blocks of decoded pixel values outside the video decoder core.

12. The video decoder core design of claim 1, wherein the core design is stored on a machine readable media.

13. The video decoder core design of claim 1, wherein the core design includes the following interface paths: (i) a slave CPU interface path for quantization matrix download, (ii) an I/O path for register access, (iii) an input path for coefficient data, (iv) input path for motion compensation, and (v) an output path for decoded samples.

14. The video decoder design of claim 1, wherein at least one of the first and the second integrated circuit designs includes an audio decoder.

15. A video decoder core design comprising a layout for hardware which performs at least some MPEG-2 video decoding functions, said video core being used on a first integrated circuit having a first integrated circuit design and a second integrated circuit having a second integrated circuit design, wherein the first and second integrated circuit designs have at least some features not in common, said video decoder core design consists of:

means for performing inverse quantization on encoded discrete cosine transform values, and said means for performing inverse quantization is configured to perform an inverse scan function;

means for providing quantization matrices for use by the inverse quantization unit in performing the inverse quantization function, and said means for providing quantization matrices also includes matrix interface means for receiving quantization matrix values from a sequence of encoded video data;

a plurality of register means which temporarily store control values received from said sequence of encoded video data;

means for performing an inverse discrete cosine transformation on discrete cosine transform coefficients, the means for performing the inverse discrete cosine transform includes a transpose ram and an output ram;

means for performing half pel compensation and outputting a result of the half pel compensation to an intermediate ram; and means for merging error correction blocks passing through an inverse discrete cosine transform unit with motion compensation blocks passing through a half pel compensation unit.

16. The video decoder core design of claim 15, wherein the means for performing inverse quantization includes input means for receiving encoded discrete cosine transform coefficients from the sequence of encoded video data; and output means for outputting decoded discrete cosine transform coefficients.

17. The video decoder core design of claim 15, wherein the plurality of register means temporarily store values which include at least coded block pattern values and half pel compensation values.

18. The video decoder core design of claim 15, wherein the means for performing an inverse discrete cosine transformation includes an interface for receiving discrete cosine transform coefficients from a source within the video decoder core design.

19. The video decoder core design of claim 18, wherein the means for performing an inverse discrete cosine transformation implements Chen's algorithm.

20. The video decoder core design of claim 15, wherein the means for performing half pel compensation includes (i) logic and memory for processing four pixel values simultaneously, and (ii) logic and memory for processing a single odd pixel value simultaneously with four other pixel values to perform right half pel averaging.

21. A video decoder circuit core, comprising a layout for hardware which performs at least some MPEG-2 video decoding functions, said video decoder circuit core being used on a first integrated circuit having a first integrated circuit design and a second integrated circuit having a second integrated circuit design, such that the first and second integrated circuit designs have at least some features not in common;

a quantization matrices unit that provides quantization matrices for use by an inverse quantization unit for performing the inverse quantization function, the quantization matrices unit includes an interface for receiving quantization matrix values from a sequence of encoded video data, and an inverse quantization unit for performing an inverse scan function;

wherein the MPEG-2 functions performed by the hardware are only the inverse scan function, inverse quantization, inverse discrete cosine transform, half pel compensation, and merge.

22. The video decoder core circuit design of claim 21, further comprising an inverse quantization unit that performs the inverse quantization function and the inverse scan function, the inverse quantization unit further comprises:

an input path for receiving encoded discrete cosine transform coefficients from the sequence of encoded video data; and an output path for outputting decoded discrete cosine transform coefficients.

23. The video decoder core circuit design of claim 21, further comprising:

an inverse discrete cosine transform unit which performs an inverse discrete cosine transformation on discrete cosine transform coefficients, and wherein the inverse discrete cosine transform unit includes an interface for receiving discrete cosine transform coefficients from a source within the video decoder core circuit design.

24. The video decoder core circuit design of claim 23, wherein the inverse discrete cosine transform unit implements Chen's algorithm.

* * * * *